(12) United States Patent
Horn et al.

(10) Patent No.: US 8,737,295 B2
(45) Date of Patent: May 27, 2014

(54) SECTOR IDENTIFICATION USING SECTOR PARAMETERS SIGNATURES

(75) Inventors: Gavin B. Horn, La Jolla, CA (US); Fatih Ulupinar, San Diego, CA (US); Parag A. Agashe, San Diego, CA (US); Rajat Prakash, La Jolla, CA (US)

(73) Assignee: Qualcomm Incorporated, San Diego, CA (US)

( * ) Notice: Subject to any disclaimer, the term of this patent is extended or adjusted under 35 U.S.C. 154(b) by 1216 days.

(21) Appl. No.: 12/269,654

(22) Filed: Nov. 12, 2008

(65) Prior Publication Data

US 2009/0129327 A1    May 21, 2009

Related U.S. Application Data

(60) Provisional application No. 60/988,631, filed on Nov. 16, 2007, provisional application No. 60/988,641, filed on Nov. 16, 2007, provisional application No. 60/988,649, filed on Nov. 16, 2007.

(51) Int. Cl.
*H04W 4/00*     (2009.01)
*H04W 36/18*    (2009.01)

(52) U.S. Cl.
USPC .......................................... 370/328; 370/338

(58) Field of Classification Search
USPC .................. 370/254, 338, 328, 329
See application file for complete search history.

(56) References Cited

U.S. PATENT DOCUMENTS

| | | |
|---|---|---|
| 5,535,424 A | 7/1996 | De Seze et al. |
| 5,640,677 A | 6/1997 | Karlsson |
| 5,722,072 A | 2/1998 | Crichton et al. |
| 5,778,316 A | 7/1998 | Persson et al. |
| 5,896,373 A | 4/1999 | Mitts et al. |
| 5,930,710 A | 7/1999 | Sawyer et al. |

(Continued)

FOREIGN PATENT DOCUMENTS

| | | |
|---|---|---|
| CN | 1110457 A | 10/1995 |
| CN | 1675954 A | 9/2005 |

(Continued)

OTHER PUBLICATIONS

3GPP TS 36.304 v8.0.0: "3rd Generation Partnership Project; Technical Specification Group Radio Access Network; Evolved Universal Terrestrial Radio Access (E-UTRA); User Equipment (UE) procedures in idle mode (Realease 8)," [Online] (Dec. 1, 2007), pp. 1-27, XP002524390.

(Continued)

*Primary Examiner* — Ayaz Sheikh
*Assistant Examiner* — Hoang-Chuong Vu
(74) *Attorney, Agent, or Firm* — Florin Corie

(57) ABSTRACT

Systems and methodologies are described that facilitate identifying sectors using sector parameters signatures. The signatures can be generated as a known function of a previous sector parameters signature (or message parameters), system time, and an identifier. In this regard, mobile devices can determine an expected identifier from comparing the sector parameters signature to a sector parameters signature computed based at least in part on the system time known to the mobile device. In addition, the mobile device can utilize a known or an inferred previous parameters signature to determine the expected identifier. Multiple signatures can be evaluated to determine expected identifiers to increase the likelihood of correct identification since the signatures are generated using the known variables along with the identifier.

21 Claims, 12 Drawing Sheets

(56) References Cited

U.S. PATENT DOCUMENTS

| | | | |
|---|---|---|---|
| 6,067,460 A | 5/2000 | Alanara et al. | |
| 6,151,484 A | 11/2000 | Ramesh | |
| 6,516,193 B1* | 2/2003 | Salmela et al. | 455/432.3 |
| 6,529,491 B1 | 3/2003 | Chang et al. | |
| 6,717,925 B1 | 4/2004 | Leppisaari et al. | |
| 6,751,460 B2 | 6/2004 | Korpela et al. | |
| 6,792,284 B1 | 9/2004 | Dalsgaard et al. | |
| 7,047,009 B2 | 5/2006 | Laroia et al. | |
| 7,289,473 B1 | 10/2007 | Padovani et al. | |
| 7,379,739 B2 | 5/2008 | Rajkotia et al. | |
| 7,480,265 B2 | 1/2009 | Cromer et al. | |
| 7,512,110 B2 | 3/2009 | Sayeedi et al. | |
| 7,706,793 B2 | 4/2010 | Zhang | |
| 7,742,498 B2 | 6/2010 | Barzegar et al. | |
| 7,869,792 B1 | 1/2011 | Zhou et al. | |
| 7,925,259 B2 | 4/2011 | Nylander et al. | |
| 7,929,970 B1 | 4/2011 | Gunasekara et al. | |
| 7,937,086 B2* | 5/2011 | Chen et al. | 455/437 |
| 8,032,153 B2* | 10/2011 | Dupray et al. | 455/456.1 |
| 2003/0051132 A1 | 3/2003 | Kobayashi et al. | |
| 2003/0134642 A1 | 7/2003 | Kostic et al. | |
| 2003/0220075 A1* | 11/2003 | Baker et al. | 455/17 |
| 2004/0009779 A1 | 1/2004 | Qu et al. | |
| 2004/0082328 A1* | 4/2004 | Japenga et al. | 455/436 |
| 2004/0136340 A1 | 7/2004 | Sanchez et al. | |
| 2004/0198220 A1 | 10/2004 | Whelan et al. | |
| 2004/0202131 A1* | 10/2004 | An et al. | 370/331 |
| 2005/0037798 A1 | 2/2005 | Yamashita et al. | |
| 2005/0099998 A1 | 5/2005 | Semper | |
| 2005/0202823 A1 | 9/2005 | Shaheen et al. | |
| 2005/0245260 A1* | 11/2005 | Nielsen et al. | 455/435.1 |
| 2006/0025127 A1 | 2/2006 | Cromer et al. | |
| 2006/0040700 A1 | 2/2006 | Roberts et al. | |
| 2006/0148479 A1 | 7/2006 | Park et al. | |
| 2006/0173976 A1 | 8/2006 | Vincent et al. | |
| 2006/0184680 A1 | 8/2006 | Ruutu et al. | |
| 2006/0189308 A1 | 8/2006 | Kurata et al. | |
| 2006/0233150 A1* | 10/2006 | Cherian | 370/342 |
| 2006/0258354 A1 | 11/2006 | Ul Haq | |
| 2006/0268746 A1 | 11/2006 | Wijting et al. | |
| 2006/0268800 A1 | 11/2006 | Sugaya et al. | |
| 2006/0276201 A1* | 12/2006 | Dupray | 455/456.1 |
| 2007/0054666 A1 | 3/2007 | Choi | |
| 2007/0097938 A1 | 5/2007 | Nylander et al. | |
| 2007/0098053 A1 | 5/2007 | Rinne et al. | |
| 2007/0104166 A1 | 5/2007 | Rahman et al. | |
| 2007/0232307 A1* | 10/2007 | Ibrahim et al. | 455/436 |
| 2007/0249291 A1 | 10/2007 | Nanda et al. | |
| 2008/0004025 A1* | 1/2008 | Lee | 455/437 |
| 2008/0039099 A1* | 2/2008 | An et al. | 455/442 |
| 2008/0069065 A1 | 3/2008 | Wu et al. | |
| 2008/0132239 A1 | 6/2008 | Khetawat et al. | |
| 2008/0192696 A1 | 8/2008 | Sachs et al. | |
| 2008/0267114 A1* | 10/2008 | Mukherjee et al. | 370/315 |
| 2008/0287134 A1 | 11/2008 | Catovic et al. | |
| 2008/0299975 A1* | 12/2008 | Sanchez et al. | 455/436 |
| 2008/0305801 A1 | 12/2008 | Burgess et al. | |
| 2009/0047954 A1* | 2/2009 | Tenny et al. | 455/435.3 |
| 2009/0047955 A1* | 2/2009 | Frenger et al. | 455/436 |
| 2009/0047960 A1 | 2/2009 | Gunnarsson et al. | |
| 2009/0052395 A1 | 2/2009 | Bao et al. | |
| 2009/0086672 A1 | 4/2009 | Gholmieh et al. | |
| 2009/0124284 A1 | 5/2009 | Scherzer et al. | |
| 2009/0129338 A1 | 5/2009 | Horn et al. | |
| 2009/0135784 A1 | 5/2009 | Horn et al. | |
| 2009/0137228 A1 | 5/2009 | Horn et al. | |
| 2009/0137249 A1 | 5/2009 | Horn et al. | |
| 2009/0252113 A1* | 10/2009 | Take | 370/331 |
| 2009/0253432 A1 | 10/2009 | Willey et al. | |
| 2009/0280819 A1 | 11/2009 | Brisebois et al. | |
| 2010/0008230 A1 | 1/2010 | Khandekar et al. | |
| 2010/0027510 A1 | 2/2010 | Balasubramanian et al. | |
| 2010/0029274 A1 | 2/2010 | Deshpande et al. | |
| 2010/0110945 A1 | 5/2010 | Koskela et al. | |
| 2010/0184439 A1 | 7/2010 | Chen et al. | |
| 2010/0227645 A1* | 9/2010 | Keevill et al. | 455/561 |
| 2010/0240367 A1 | 9/2010 | Lee et al. | |
| 2010/0240368 A1 | 9/2010 | Fox et al. | |
| 2010/0323663 A1 | 12/2010 | Vikberg et al. | |
| 2011/0263260 A1 | 10/2011 | Yavuz et al. | |
| 2013/0065594 A1 | 3/2013 | Somasundaram et al. | |

FOREIGN PATENT DOCUMENTS

| | | |
|---|---|---|
| CN | 1675956 A | 9/2005 |
| CN | 1701584 A | 11/2005 |
| CN | 1842210 A | 10/2006 |
| CN | 1964522 A | 5/2007 |
| CN | 101015221 A | 8/2007 |
| DE | 19510256 | 9/1995 |
| EP | 0589552 | 3/1994 |
| EP | 1670179 | 6/2006 |
| EP | 1699253 | 9/2006 |
| EP | 1717993 | 11/2006 |
| EP | 1775976 | 4/2007 |
| EP | 1835780 | 9/2007 |
| EP | 2077690 | 7/2009 |
| JP | 8501430 | 2/1996 |
| JP | 2003506960 A | 2/2003 |
| JP | 2003116162 A | 4/2003 |
| JP | 2004159304 A | 6/2004 |
| JP | 2004166273 A | 6/2004 |
| JP | 2004260824 A | 9/2004 |
| JP | 2006148836 A | 6/2006 |
| JP | 2007104417 A | 4/2007 |
| JP | 2007534227 A | 11/2007 |
| JP | 2009504050 A | 1/2009 |
| JP | 2009510973 A | 3/2009 |
| KR | 100711531 | 4/2007 |
| RU | 2145774 C1 | 2/2000 |
| RU | 2199834 C2 | 2/2003 |
| RU | 2005129268 A | 3/2007 |
| RU | 2308810 | 10/2007 |
| WO | WO02080600 | 10/2002 |
| WO | WO02087275 | 10/2002 |
| WO | WO03009633 | 1/2003 |
| WO | WO2004019643 | 3/2004 |
| WO | WO2004054310 | 6/2004 |
| WO | 2005065214 A2 | 7/2005 |
| WO | WO2005122621 A1 | 12/2005 |
| WO | 2007015066 A2 | 2/2007 |
| WO | 2007015071 A2 | 2/2007 |
| WO | 2007040452 | 4/2007 |
| WO | 2007040454 A2 | 4/2007 |
| WO | WO2007075954 | 7/2007 |
| WO | WO2007080490 | 7/2007 |
| WO | WO2007096763 A2 | 8/2007 |
| WO | WO2007097672 | 8/2007 |
| WO | WO2007097673 | 8/2007 |
| WO | WO2008030956 | 3/2008 |
| WO | WO2008124282 | 10/2008 |
| WO | WO2009007720 | 1/2009 |
| WO | WO2009053710 | 4/2009 |
| WO | WO2009064931 | 5/2009 |

OTHER PUBLICATIONS

ETSI TS 125.304 V7.1.0: "Universal Mobile Telecommunications System (UMTS); User Equipment (UE) procedures in idle mode and procedures for cell reselection in connected mode (3GPP TS 25.304 version 7.1.0 Release 7)" ETSI Standards, Sophia Antipolis Cedex, France, (Dec. 1, 2006), XP014039981.

International Search Report and the Written Opinion—PCT/US2008/083643, International Search Authority—European Patent Office—Mar. 25, 2009.

Jung, Young-Ho et al: "PN offset Planning for Synchronous CDMA Based Fiber-Optic Microcellular Systems," Vehicular Technology Conference Proceedings, 2000. Internet Citation, (May 2000), pp. 2275-2279, XP002480275 [retrieved on May 15, 2000] paragraphs [0001]—[00VI], doi: 10.1109/VETECS.2000.851678.

QUALCOMM Europe: "Implicit Priority for CSG cells," 3GPP TSG-RAN WG2 #63bis, R2-086586, (Nov. 10, 2008), XP002557108.

(56) References Cited

OTHER PUBLICATIONS

QUALCOMM Europe: "Linger timer for HeNB reselection to improve standby time of UE in mobility situations," 3GPP Draft TSG-RAN WG2 meeting #63; R2-084155, 3rd Generation Partnership Project (3GPP), Jeju, Korea; (Aug. 12, 2008), XP050319291.

QUALCOMM Europe: "Linger Timer for HNB Cell Reselection," 3GPP Draft TSG-RAN WG2 meeting #63; R2-084342, 3rd Generation Partnership Project (3GPP), Jeju, Korea, (Aug. 22, 2008), XP050319418.

QUALCOMM Europe: "Parameter for HNB White List Cell Selection," 3GPP Draft TSG-RAN WG2 meeting #63; R2-084552, 3rd Generation Partnership Project (3GPP), Jeju, Korea (Aug. 18, 2008), XP050319589.

QUALCOMM Europe: "UTRA HNB Idle Mode (Re)selection," 3GPP Draft TSG-RAN WG2 #62bis; R2-084347, 3rd Generation Partnership Project (3GPP), Jeju, Korea (Aug. 18, 2008), XP050319423.

Rapporteur (Huawei): "Email report on Home-(e)NB mobility, main issues [63_LTE_C01,]" 3GPP Draft TSG-RAN2 Meeting #63bis; R2-085705, 3rd Generation Partnership Project (3GPP), Prague, Czech Republic; (Oct. 1, 2008), XP050320478.

3GPP TR 24.801: "Pseudo-CR on Allowed CSG List update," 3GPP TSG CT WG1 meeting #55; C2-083427, v 1.1.1, Budapest, Hungary, Aug. 18-22, 2008.

ASUSTeK, "CSG related system information and CSG subscription information", 3GPP TSG-RAN WG2 #60, R2-075133, Nov. 9, 2007.

Ericsson, "Idle state access restriction for CSGs", 3GPP TSG-RAN WG2 #60, Tdoc R2-074684, Nov. 9, 2007, <URL:http://www.3gpp.org/ftp/tsg_ran/WG2_RL2/TSGR2_60/Docs/R2-074684.zip>.

Ntt Docomo, et al., "CSG with limited open access" 3GPP Draft; R2-075150 CSG With Limited Open Access, 3RD Generation Partnership Project (3GPP), Mobile Competence Centre ; 650, Route Des Lucioles ; F-06921 Sophia-Antipolis Cedex ; France, vol. RAN WG2, no. Jeju; 20071112, Nov. 12, 2007, XP050137597 [retrieved on Nov. 12, 2007] the whole document.

Vodafone, "Geran to LTE Handover: Home Cell Deployment Considerations", 3GPP Workshop GERAN/RAN, TDoc GR-070020, Sep. 28, 2007.

Vodafone Group: "Signalling on a CSG Cell" 3GPP Draft; R2-072831, 3rd Generation Partnership Project (3GPP), Mobile Competence Centre ; 650, Route Des Lucioles ; F-06921 Sophia-Antipolis Cedex ; France, vol. RAN WG2, no. Orlando, USA; 20070702, Jul. 2, 2007, XP050135608.

Ericsson: "Idle state access restriction for home eNB", R2-073415, 3GPP TSG-RAN WG2#59, Aug. 24, 2007.

"Evolved Universal Terrestrial Radio Access (E-UTRA) and Evolved Universal Terrestrial Radio Access (E-UTRAN); Overall description; Stage 2 (3GPP TS 36.300 version 8.4.0 Release 8); ETSI TS 136 300", ETSI Standards, LIS, Sophia Antipolis Cedex, France, vol. 3-R2, No. V8.4.0, Apr. 1, 2008, XP014041816, ISSN: 0000-0001 chapters: 10.1.1.2; 10.1.3; 10.1.3.2.

NTT DoCoMo, et al., "Cell ID Assignment for Home Node B" 3GPP Draft; R2-073374 , 3rd Generation Partnership Project (3GPP), Mobile Competence Centre; 650, Route des Lucioles; F-06921 Sophia-Antipolis Cedex; France, Athens, Grece, vol. R2-073374, No. 59, Aug. 20, 2007, pp. 1-5,XP002541822 the whole document.

Panasonic, "CSG Cell Prioritization by UE", 3GPP TSG RAN WG2 #59 R2-073282, Aug. 20, 2007.

Taiwan Search Report—TW097144275—TIPO—Jul. 13, 2012.

T-Mobile, Report on email discussion "Home Cells (1)—General concepts & solutions for LTE", 3GPP TSG RAN2#60 R2-074904, Nov. 5, 2007.

Asustek, "Mobility Information and Cell (re)selection, " Discussion & Decision, 3GPP TSG-RAN WG2 #60 Nov. 5-9, 2007, Jeju, Korea, R2-075135, pp. 1-8.

Huawei, "Detection of conflicting cell identities", 3GPP TSG-RAN-WG2 Meeting #59bis, R2-074216, Oct. 2007, P.1-P.3, URL:http://www.3gpp.org/ftp/tsg_ran/WG2_RL2/TSGR2_59bis/Docs/R2-074216.zip.

TSG RAN WG2, "LS on Closed Subscriber Groups for LTE Home cells", 3GPP TSG-RAN WG2#58bis R2-072991, Release 8, Jun. 25, 2007.

* cited by examiner

SECTOR IDENTIFICATION USING SECTOR PARAMETERS SIGNATURES

CROSS-REFERENCE TO RELATED APPLICATIONS

This application claims the benefit of U.S. Provisional Patent application Ser. No. 60/988,631 entitled "APPARATUS AND METHOD TO FACILITATE IDLE STATE HANDOFF IN SYSTEMS WITH RESTRICTED ASSOCIATION" which was filed Nov. 16, 2007, U.S. Provisional Patent application Ser. No. 60/988,641 entitled "APPARATUS AND METHOD TO FACILITATE CONNECTED STATE HANDOFF IN SYSTEMS WITH RESTRICTED ASSOCIATION" which was filed Nov. 16, 2007, and U.S. Provisional Patent application Ser. No. 60/988,649 entitled "APPARATUS AND METHOD TO FACILITATE MANAGEMENT AND ADVERTISEMENT OF NEIGHBOR LISTS IN SYSTEMS WITH RESTRICTED ASSOCIATION" which was filed Nov. 16, 2007. The entireties of the aforementioned applications are herein incorporated by reference.

In addition, this application is related co-pending U.S. Patent applications "UTILIZING RESTRICTION CODES IN WIRELESS ACCESS POINT CONNECTION ATTEMPTS" by Gavin Horn, et al., Ser. No. 12/269,611, "FAVORING ACCESS POINTS IN WIRELESS COMMUNICATIONS" by Gavin Horn, et al., Ser. No. 12/269,619, "UTILIZING BROADCAST SIGNALS TO CONVEY RESTRICTED ASSOCIATION INFORMATION" by Gavin Horn, et al., Ser. No. 12/269,637, and "CLASSIFYING ACCESS POINTS USING PILOT IDENTIFIERS" by Gavin Horn, et al., Ser. No. 12/269,642, all of which are filed concurrently herewith, assigned to the assignee hereof, and expressly incorporated by reference herein.

BACKGROUND

I. Field

The following description relates generally to wireless communications, and more particularly to identifying access points in a wireless communication network.

II. Background

Wireless communication systems are widely deployed to provide various types of communication content such as, for example, voice, data, and so on. Typical wireless communication systems may be multiple-access systems capable of supporting communication with multiple users by sharing available system resources (e.g. bandwidth, transmit power, . . . ). Examples of such multiple-access systems may include code division multiple access (CDMA) systems, time division multiple access (TDMA) systems, frequency division multiple access (FDMA) systems, orthogonal frequency division multiple access (OFDMA) systems, and the like. Additionally, the systems can conform to specifications such as third generation partnership project (3GPP), 3GPP long term evolution (LTE), ultra mobile broadband (UMB), etc.

Generally, wireless multiple-access communication systems may simultaneously support communication for multiple mobile devices. Each mobile device may communicate with one or more base stations via transmissions on forward and reverse links. The forward link (or downlink) refers to the communication link from base stations to mobile devices, and the reverse link (or uplink) refers to the communication link from mobile devices to base stations. Further, communications between mobile devices and base stations may be established via single-input single-output (SISO) systems, multiple-input single-output (MISO) systems, multiple-input multiple-output (MIMO) systems, and so forth. In addition, mobile devices can communicate with other mobile devices (and/or base stations with other base stations) in peer-to-peer wireless network configurations.

MIMO systems commonly employ multiple ($N_T$) transmit antennas and multiple ($N_R$) receive antennas for data transmission. The antennas can relate to both base stations and mobile devices, in one example, allowing bi-directional communication between the devices on the wireless network. As mobile devices move throughout service areas, cells utilized for communication by the devices can be reselected between one or more access points (e.g., macrocells, femtocells, etc.). This can occur, for example, where an available access point, or serving sector thereof, can offer a better signal or service than a current access point. The mobile devices can measure parameters related to one or more cells or sectors, such as signal quality, service level, etc. and rank the cells or sectors according to desirability, which can be based on one or more of the parameters. In one example, the available access point can relate to a home access point for a given mobile device offering desirable billing, coverage, service options, etc. Accordingly, cells utilized for communication can be reselected to the more desirable access point when within a specified range.

SUMMARY

The following presents a simplified summary of one or more embodiments in-order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In accordance with one or more embodiments and corresponding disclosure thereof, various aspects are described in connection with facilitating identifying access points, or sectors thereof, in wireless communication networks. For example, a sector parameters signature transmitted by the access points at each sector can be utilized for identification. The signature can be utilized to identify whether sector parameters, which are transmitted in a subsequent message, have changed, but also can be a function of a system time of the access point and the sector identifier. Using the additional parameters, mobile devices can determine an expected sector identifier from the signature without having to read a separate sector parameters message. Subsequent sector parameters signatures can be evaluated to further determine a subsequent expected sector identifier. Where the subsequent identifier is substantially similar to the originally determined identifier, the mobile device can predict the sector to be that identified by the expected identifiers with high likelihood. It is to be appreciated that additional subsequent evaluations of sector parameters signatures can be made to determine additional expected identifiers where each matched identifier increases the likelihood.

According to related aspects, a method for identifying an access point in a wireless communication network is provided. The method includes receiving a first sector parameters signature from an access point based at least in part on a previous sector parameters signature, an identifier, and a system time of transmitting the first sector parameters signature. The method also includes computing a second sector parameters signature based at least in part on the previous sector parameters signature, the system time, and a predicted identifier and comparing the first and second sector parameters signatures to determine a match between the identifier and the predicted identifier.

Another aspect relates to a wireless communications apparatus. The wireless communications apparatus can include at least one processor configured to receive a first sector parameters signature from an access point based at least in part on a previous sector parameters signature, an identifier and a system time of transmitting the first sector parameters signature and determine a second sector parameters message using a predicted identifier, the previous sector parameters signature, and the system time. The processor is further configured to compare the identifier to the predicted identifier to determine a match therebetween. The wireless communications apparatus also comprises a memory coupled to the at least one processor.

Yet another aspect relates to a wireless communications apparatus that facilitates identifying an access point in a wireless network. The wireless communications apparatus can comprise means for receiving a first sector parameters signature from an access point and means for computing a second sector parameters signature utilizing a known function along with a predicted identifier, a previous sector parameters signature, and a system time for transmitting the first sector parameters signatures. The wireless communications apparatus can additionally include means for comparing the first and second sector parameters signatures to determine a match between the identifier and the predicted identifier.

Still another aspect relates to a computer program product, which can have a computer-readable medium including code for causing at least one computer to receive a first sector parameters signature from an access point based at least in part on a previous sector parameters signature, an identifier, and a system time of transmitting the first sector parameters signature. The computer-readable medium can also comprise code for causing the at least one computer to compute a second sector parameters signature based at least in part on the previous sector parameters signature, the system time, and a predicted identifier. Moreover, the computer-readable medium can comprise code for causing the at least one computer to compare the first and second sector parameters signatures to determine a match between the identifier and the predicted identifier.

Moreover, an additional aspect relates to an apparatus. The apparatus can include a sector parameters signature receiver that receives a first sector parameters signature from a sector generated using a known function based at least in part on a previous sector parameters signature, a system time, and an identifier. The apparatus can further include a sector identifier determiner that computes a second sector parameters signature based at least in part on the known function utilizing a predicted identifier, the previous sector parameters signature, and the system time, the sector identifier determiner compares the first and second sector parameters signatures to determine a match between the identifier and the predicted identifier.

According to additional aspects, a method for indicating access point identification in a wireless communication network is provided. The method can include generating a sector parameters message comprising one or more parameters related to communication in a sector and generating a sector parameters signature based at least in part on the sector parameters message, an identifier, and a system time. The method can also include transmitting the sector parameters signature over a wireless network to facilitate identification.

Another aspect relates to a wireless communications apparatus. The wireless communications apparatus can include at least one processor configured to generate a sector parameters message comprising one or more parameters related to communication in a sector and generate a sector parameters signature based at least in part on the sector parameters message, an identifier, and a system time. The processor is further configured to broadcast the sector parameters signature over a wireless network to facilitate sector-related identification. The wireless communications apparatus also comprises a memory coupled to the at least one processor.

Yet another aspect relates to a wireless communications apparatus that facilitates indicating access point identification in wireless communications. The wireless communications apparatus can comprise means for generating a sector parameters message comprising one or more parameters related to communication in the sector and means for generating a sector parameters signature based at least in part on the sector parameters message, an identifier, and a system time. The wireless communications apparatus can additionally include means for transmitting the sector parameters signature over a wireless network to facilitate identification.

Still another aspect relates to a computer program product, which can have a computer-readable medium including code for causing at least one computer to generate a sector parameters message comprising one or more parameters related to communication in the sector. The computer-readable medium can also comprise code for causing the at least one computer to generate a sector parameters signature based at least in part on the sector parameters message, an identifier, and a system time. Moreover, the computer-readable medium can comprise code for causing the at least one computer to transmit the sector parameters signature over a wireless network to facilitate identification.

Moreover, an additional aspect relates to an apparatus. The apparatus can include a sector parameters message generator that generates a sector parameters message comprising one or more parameters related to communication in a sector and a sector parameters signature generator that generates a sector parameters signature based at least in part on the sector parameters message, an identifier, and a system time. The apparatus can further include a transceiver that transmits the sector parameters signature over a wireless network to facilitate sector-related identification.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the described embodiments are intended to include all such aspects and their equivalents.

DETAILED DESCRIPTION

Figure 1:
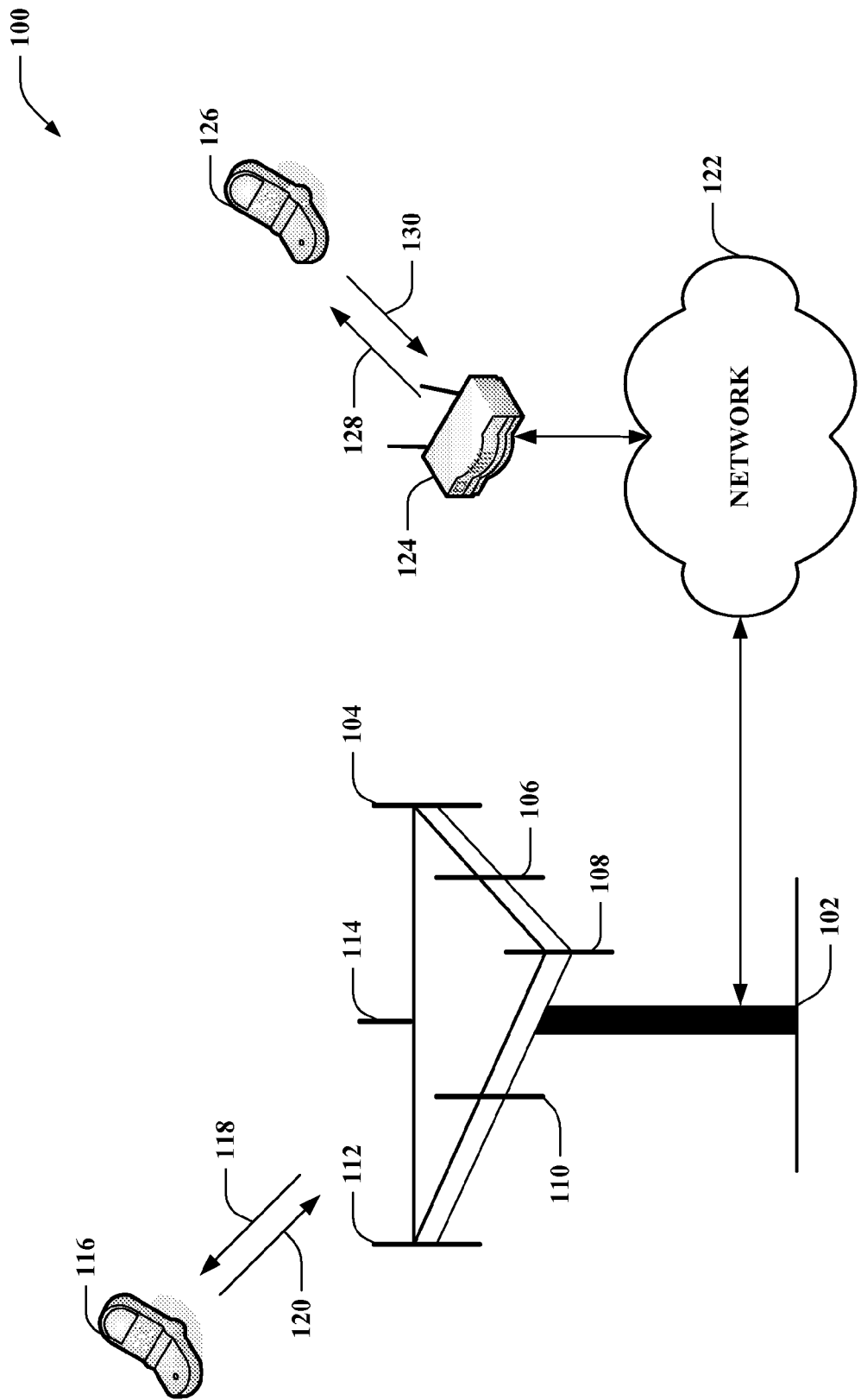
FIG. 1 is an illustration of a wireless communication system in accordance with various aspects set forth herein.

Various embodiments are now described with reference to the drawings, wherein like reference numerals are used to refer to like elements throughout. In the following description, for purposes of explanation, numerous specific details are set forth in-order to provide a thorough understanding of one or more embodiments. It may be evident, however, that such embodiment(s) can be practiced without these specific details. In other instances, well-known structures and devices are shown in block diagram form in-order to facilitate describing one or more embodiments.

As used in this application, the terms "component," "module," "system," and the like are intended to refer to a computer-related entity, either hardware, firmware, a combination of hardware and software, software, or software in execution. For example, a component can be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

Furthermore, various embodiments are described herein in connection with a mobile device. A mobile device can also be called a system, subscriber unit, subscriber station, mobile station, mobile, remote station, remote terminal, access terminal, user terminal, terminal, wireless communication device, user agent, user device, or user equipment (UE). A mobile device can be a cellular telephone, a cordless telephone, a Session Initiation Protocol (SIP) phone, a wireless local loop (WLL) station, a personal digital assistant (PDA), a handheld device having wireless connection capability, computing device, or other processing device connected to a wireless modem. Moreover, various embodiments are described herein in connection with a base station. A base station can be utilized for communicating with mobile device(s) and can also be referred to as an access point, Node B, evolved Node B (eNode B or eNB), base transceiver station (BTS) or some other terminology.

Moreover, various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

The techniques described herein may be used for various wireless communication systems such as code division multiple access (CDMA), time division multiple access (TDMA), frequency division multiple access (FDMA), orthogonal frequency division multiple access (OFDMA), single carrier frequency domain multiplexing (SC-FDMA) and other systems. The terms "system" and "network" are often used interchangeably. A CDMA system may implement a radio technology such as Universal Terrestrial Radio Access (UTRA), CDMA2000, etc. UTRA includes Wideband-CDMA (W-CDMA) and other variants of CDMA. CDMA2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is an upcoming release that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). CDMA2000 and UMB are described in documents from an organization named "3rd Generation Partnership Project 2" (3GPP2).

Referring now to FIG. 1, a wireless communication system 100 is illustrated in accordance with various embodiments presented herein. System 100 comprises a base station 102 that can include multiple antenna groups. For example, one antenna group can include antennas 104 and 106, another group can comprise antennas 108 and 110, and an additional group can include antennas 112 and 114. Two antennas are illustrated for each antenna group; however, more or fewer antennas can be utilized for each group. Base station 102 can additionally include a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art.

Base station 102 can communicate with one or more mobile devices such as mobile device 116 and mobile device 126; however, it is to be appreciated that base station 102 can communicate with substantially any number of mobile devices similar to mobile devices 116 and 126. Mobile devices 116 and 126 can be, for example, cellular phones, smart phones, laptops, handheld communication devices, handheld computing devices, satellite radios, global positioning systems, PDAs, and/or any other suitable device for communicating over wireless communication system 100. As depicted, mobile device 116 is in communication with antennas 112 and 114, where antennas 112 and 114 transmit information to mobile device 116 over a forward link 118 and receive information from mobile device 116 over a reverse link 120. In a frequency division duplex (FDD) system, forward link 118 can utilize a different frequency band than that used by reverse link 120, for example. Further, in a time division duplex (TDD) system, forward link 118 and reverse link 120 can utilize a common frequency.

Each group of antennas and/or the area in which they are designated to communicate can be referred to as a sector or cell of base station 102. For example, antenna groups can be designed to communicate to mobile devices in a sector of the areas covered by base station 102. In communication over forward link 118, the transmitting antennas of base station 102 can utilize beamforming to improve signal-to-noise ratio of forward link 118 for mobile device 116. Also, while base station 102 utilizes beamforming to transmit to mobile device 116 scattered randomly through an associated coverage, mobile devices in neighboring cells can be subject to less interference as compared to a base station transmitting through a single antenna to all its mobile devices. Moreover, mobile devices 116 and 126 can communicate directly with one another using a peer-to-peer or ad hoc technology.

In addition, the base station 102 can communicate with a network 122, which can be one or more networks including a wireless service access network (e.g., a 3G network), over a backhaul link connection. The network 122 can store information regarding access parameters related to the mobile device 116 and 126 and other parameters of a wireless access network to provide service to the devices 116 an 126. Furthermore, a femtocell 124 can be provided to facilitate communicating with the mobile device 126 over forward link 128 and reverse link 130 (similarly to forward link 118 and reverse link 120, as described supra). The femtocell 124 can provide access to one or more mobile devices 126 much like the base station 102, but on a smaller scale. In one example, femtocell 124 can be configured in a residence, business, and/or other close range setting (e.g., theme park, stadium, apartment complex, etc.). The femtocell 124 can connect to the network 122 utilizing a backhaul link connection, which can be over a broadband Internet connection (T1/T3, digital subscriber line (DSL), cable, etc.), in one example. The network 122 can similarly provide access information for the mobile device 126.

According to an example, mobile devices 116 and 126 can travel over service areas performing cell reselection among disparate base stations and/or femtocells during travel. In this regard, the mobile devices 116 and 126 can effectuate continuous wireless service seamless to users of the mobile devices 116 and 126. In one example (not shown), mobile device 126 can have been communicating with the base station 102 similarly to the mobile device 116, and can have moved into a specified range of the femtocell 124. In this regard, the mobile device 126 can have reselected one or more cells related to the femtocell 124 to receive more desirable wireless service access. In one example, the femtocell 124 can be a home access point for the mobile device 126 offering more desirable billing and/or other access options. In another example, the femtocell 124 can be related to a business or venue offering options or data tailored to the respective business or venue. Thus, mobile device 126 can reselect one or more cells related to the femtocell 124, in an idle and/or connected mode, to receive such tailored options. In addition, as mobile device 126 moves toward base station 102, it can reselect a cell related thereto, for a variety of reasons (e.g., to mitigate interference on the femtocell 124, to receive a more optimal signal or increased throughput, etc.).

In traveling over the service area, mobile devices 116 and/or 126 can continually measure available base stations (such as base station 102), femtocells (such as femtocell 124), and/or other access points, to determine when cell reselection is beneficial to the mobile devices 116 and/or 126. The measuring can include, for example, evaluating signal quality, throughput, services available, a wireless access provider related to the access point, and/or the like. Based on one or more of the measurements, the mobile devices 116 and/or 126 can rank access points for reselection. Upon determining the ranking, the mobile devices 116 and/or 126 can attempt cell reselection to the highest ranking access point. In addition, the mobile devices 116 and/or 126 can maintain a list of accessible access points and/or groups of accessible access points. The accessible access points can relate to, for example, restricted association access points that the mobile devices 116 and/or 126 are authorized to access and/or to which access is preferred or otherwise favorable over other access points.

In one example, the femtocell 124 can be such a restricted association access point. Restricted association access points, for example, can be restricted in some aspects where each access point provides certain services to certain mobile devices (e.g., mobile devices 116 and/or 126) but not necessarily to other mobile devices or access terminals (not shown). For example, the femtocell 124 can be restricted to not provide to the other mobile devices or access terminals registration, signaling, voice call, data access, and/or additional services. Restricted association access points can be deployed in an ad-hoc manner. For example, a given homeowner can install and configure a restricted access point for the home.

In one example, the mobile devices 116 and/or 126 can identify one or more available access points based at least in part on one or more indicators in a broadcast signal related to the access point(s). Upon receiving the one or more indicators, the mobile devices 116 and/or 126 can ensure the access point(s) is/are in the list, or that a related group identifier is in the list, before attempting cell reselection. In another example, the mobile devices 116 and/or 126 can verify association of the access point with the list before measuring the parameters for ranking.

In one example, the mobile devices 116 and/or 126 can determine an identifier of the access points, such as base station 102 and/or femtocell 124, a related group identifier, and/or a sector identifier based at least in part on evaluating one or more sector parameters signatures transmitted by the access point over in an overhead broadcast message. For example, the base station 102 and/or femtocell 124 can transmit a sector parameters signature for a given sector, which indicates whether sector parameters have changed with respect to previous parameters. The signature can be generated as a function of a previous sector parameters signature, a system time of the access point, and an identifier, which can be a sector, access point and/or group identifier. It is to be appreciated that additional parameters can be utilized to generate the signature. The mobile devices 116 and/or 126 can receive the sector parameters signatures and compute expected sector identifiers based at least in part on the signature using the system time, previous signature, a previously received sector identifier, etc.

For example, the known function for computing the signature can be a hash function, a pseudo noise sequence function, and/or substantially any function that can generate a random or pseudo random sequence of signatures that can be efficiently calculated from a first signature, the change in system time since the first signature was seen, and the identifier. According to one example, the random sequence can be utilized with the signatures to avoid collision among neighboring cells (e.g., neighboring cells typically do not advertise the same sector parameters signature very often if they each have a different identifier and each time the signature changes randomly based on the identifier).

According to an example, the mobile devices 116 and/or 126 can receive the sector parameters signatures regardless of sector identification to determine when sector parameters change for a given sector of the base station 102 and/or femtocell 124. Since the signatures change as a function of time and can be random, collision among neighboring sectors can be minimized. The mobile devices 116 and/or 126 can analyze multiple signatures for a given sector computing expected sector parameters signatures for each sector; where the computed sector parameters signature matches a received signature, the mobile devices 116 and/or 126 can conclude that the sector is identified. This is so since the signature is a function of the identifier, time, and the previous signature. Thus, collision between received signatures can likely be resolved by computing one or more subsequent signatures and comparing the signatures to those received in the sector. In this regard, the mobile devices 116 and/or 126 need not receive and evaluate the subsequent sector parameters message comprising the actual parameters to identify the sector, access point and/or group. In addition, sector parameters signatures can be transmitted more frequently than the sector parameters message. Thus, evaluating the signatures to identify the sector can conserve time and resources on the mobile devices 116 and/or 126 during sector identification, for example. It is to be appreciated that substantially any type of identifier can be utilized in the foregoing known function for subsequent interpretation by the mobile devices 116 and/or 126.

Figure 2:
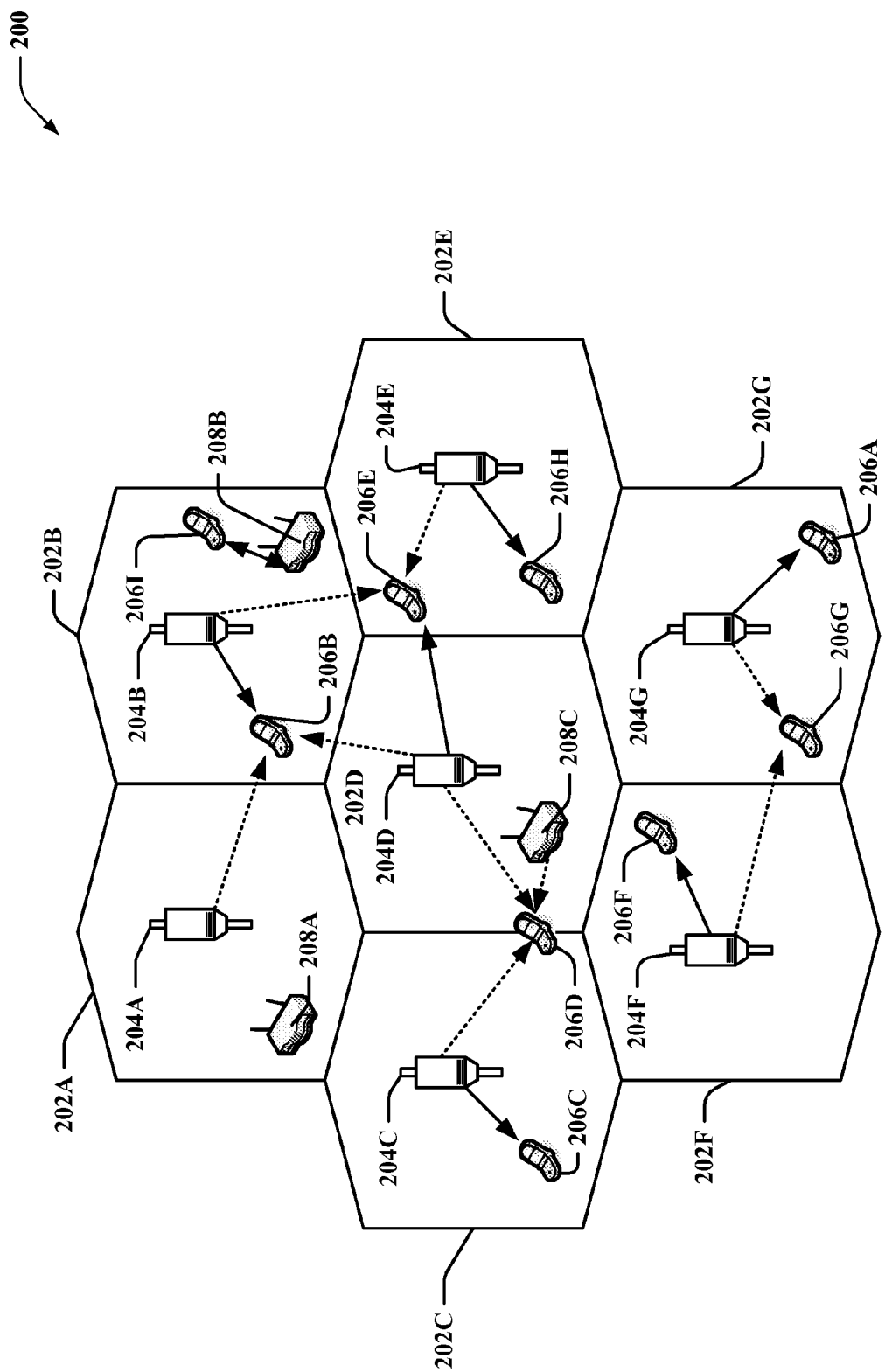
FIG. 2 is an illustration of a wireless communication network that facilitates cell reselection.

Now referring to FIG. 2, a wireless communication system 200 configured to support a number of mobile devices is illustrated. The system 200 provides communication for multiple cells, such as for example, macrocells 202A-202G, with each cell being serviced by a corresponding access point 204A-204G. As described previously, for instance, the access points 204A-204G related to the macrocells 202A-202G can be base stations. Mobile devices 206A-206I are shown dispersed at various locations throughout the wireless communication system 200. Each mobile device 206A-206I can communicate with one or more access points 204A-204G on a forward link and/or a reverse link, as described. In addition, access points 208A-208C are shown. These can be smaller scale access points, such as femtocells, offering services related to a particular service location, as described. The mobile devices 206A-206I can additionally communicate with these smaller scale access points 208A-208C to receive offered services. The wireless communication system 200 can provide service over a large geographic region, in one example (e.g. macrocells 202A-202G can cover a few blocks in a neighborhood, and the femtocell access points 208A-208C can be present in areas such as residences, office buildings, and/or the like as described). In an example, the mobile devices 206A-206I can establish connection with the access points 204A-204G and/or 208A-208C over the air and/or over a backhaul connection.

Additionally, as shown, the mobile devices 206A-206I can travel throughout the system 200 and can reselect cells related to the various access points 204A-204G and/or 208A-208C as it moves through the different macrocells 202A-202G or femtocell coverage areas. In one example, the one or more of the mobile devices 206A-206I can be associated with a home femtocell related to at least one of femtocell access points 208A-208C. For example, mobile device 206I can be associated with femtocell access point 208B as its home femtocell. Thus, though mobile device 206I is in macrocell 202B, and thus in coverage area of access point 204B, it can communicate with the femtocell access point 208B instead of (or in addition to) access point 204B. In one example, the femtocell access point 208B can provide additional services to the mobile device 206I, such as desirable billing or charges, minute usage, enhanced services (e.g., faster broadband access, media services, etc.). Thus, when the mobile device 206I is in range of the femtocell access point 208B, it can be reined in to communicate therewith by favoring the femtocell access point 208B in reselection.

For example, mobile device 206D can be associated with femtocell access point 208C. As the mobile device 206D moves from macrocell 202C into 202D and closer to access points 204D and/or 208C, it can begin the cell reselection process, as described herein. This can include, for example, measuring surrounding cell parameters (e.g., related to access points 204C, 204D, and 208C) to determine a desirable connection. The parameters can relate to, for example, signal quality, connection throughput, services offered, a service provider related to the access point, and/or the like. The mobile device 206D can additionally verify an identifier of the access point as present in a list of accessible access points, as described. The list can additionally or alternatively identify groups of access points where a group identifier of the access point can be verified with group identifiers in the list. In the foregoing example, the mobile device 206D can measure parameters for access points 204C, 204D, and 208C and rank the cells to determine whether to perform cell reselection from access point 204C to one of the others if their rank is higher. As in the previous example, where femtocell access point 208C relates to a home femtocell of the mobile device 206D, it can favor it for reselection (e.g., by evaluating an added parameter offset to increase its value and/or hysteresis to decrease parameter values of other access points, for example). If one or more of the disparate access points 204D and/or 208C rank higher than the access point 204C, mobile device 206D can reselect one or more cells related to the disparate access point 204D or 208C whether in an idle or connected mode.

In one example, one or more of the disparate access points 204D and/or 208C can implement restricted association where some mobile devices cannot connect thereto, and/or the access points 204D and/or 208C can restrict certain mobile devices with respect to providing signaling, data access, registration, service, and/or the like. This can be based at least in part on a service provider of the mobile device and the restricted associated access point, for example. In another example, the restricted association access point can relate to certain mobile devices, such as a corporate access point restricting access only to corporate issued mobile devices. Thus, if the mobile device 206D cannot reselect cells related to one or more of the disparate access points 204D and/or 208C due to restricted association, it can attempt cell reselection with one or more of the other ranked access points until it finds an access point to which it can connect. Where the mobile device 206D cannot connect to access point 204D and/or 208C due to restricted association, it can receive a restriction code indicating the reason for the restriction.

Furthermore, as described, the mobile devices 206A-206I can maintain a list of accessible access points and/or groups thereof. In one example, the list can include only certain types of access points (such as femtocells) since other types of access points (such as macrocells) can be accessible from substantially any mobile device. The list of accessible access points and/or groups can be originally populated, for example, by one or more access points in communication with the mobile device 206A-206I, which can retrieve the information from an underlying wireless network as described. As the mobile devices 206A-206I move throughout the coverage area of the wireless system 200 and reselects cells as described, it can first verify the cells as being present in the list where relevant. In one example, if the mobile devices 206A-206I determine one or more femtocell access points 208A-208C to be the highest ranked cell based on measurements as described, it can verify that the respective femtocell access point is in the list. If not, the mobile devices 206A-206I can decide not to attempt access to the femtocell access point and can attempt connection with the next highest ranked access point and/or attempt to locate another access point on a disparate frequency.

As described above, the access points 204A-204G and/or 208A-208C, can transmit sector parameters signatures that indicate whether sector parameters have changed between related messages. The access points 204A-204G and/or 208A-208C can generate the sector parameters signatures as a known function of one or more previous sector parameters signatures, system time, and an identifier, as described, for transmission in an overhead broadcast message. Mobile devices 206A-206I traveling from sector to sector can receive the sector parameters signatures utilizing the signatures to identify one or more of the access points 204A-204G and/or 208A-208C, group or sector thereof, and/or the like. For example, one or more of the mobile devices 206A-206I can receive a sector parameters signature from one or more access points 204A-204G and/or 208A-208C and can compute an expected sector parameters signature based at least in part on the known function used for generating the signature. In addition, the mobile devices 206A-206I can utilize known values and an expected identifier along with the function to determine the signature. The values can include, for example, a system time as measured by the mobile devices 206A-206I and/or determined from one or more disparate parameters of the one or more access points 204A-204G and/or 208A-208C. Further, the known values can also include the one or more previous sector parameters signatures of the one or more access points 204A-204G and/or a predicted sector-related identifier.

In an example, the sector parameters signatures can relate to sector parameters, as described, in a sector parameters message. The parameters can include, for example, a network identifier, country code, location information (such as latitude and longitude), system time, neighbor lists, radio access parameters, and/or substantially any other parameters related to the sector and/or access point providing the sector. One or more of the foregoing parameters can be used to calculate a first sector parameters signature, and one or more subsequent signatures can then be based on this as well as a function of the system time and the identifier. In this regard, knowing the system time, identifier, signature at a given time, as well as the known function, one or more of the mobile devices 206A-206I can calculate the signature at a future time. Thus, in one example, the mobile devices 206A-206I can have already communicated with or otherwise received parameters related to the access point.

Once computed, the one or more mobile devices 206A-206I can determine whether conflicting possible identifications are possible, for example. If so, the one or more mobile devices 206A-206I can evaluate a subsequent sector parameters signature from the sector related to one or more access points 204A-204G and/or 208A-208C and compute another expected sector parameters signature using the predicted sector identifier to determine a match. If the expected signature matches the received signature, this can increase the likelihood of successful identification since the identifier, which can be unique, is utilized in generating the signature and the signature can be generated using a random function. It is to be appreciated that the sector parameters signatures can be a data string, data structure, primitive type, etc. In one example, the signatures can be a number of bits in a string (e.g. a 16-bit string).

In one example, the one or more mobile devices 206A-206I can compute and compare a number of subsequent expected signatures to received signatures. In this regard, a level of threshold confidence of identification can be achieved. In addition, the one or more mobile devices 206A-206I can utilize the determined sector-related identifier in subsequent actions. For example, as described, the one or more mobile devices 206A-206I can utilize the identifier to verify that the one or more access points 204A-204G and/or 208A-208C or related groups are present in a maintained list of accessible access points or related groups of access points. If so, the one or more mobile devices 206A-206I can initiate communications with, reselect one or more cells related to, and/or camp on the one or more access points 204A-204G and/or 208A-208C. Camping can refer to operating in an idle mode in the sector where the mobile device sleeps and periodically wakes up to receive events such as pages, loss of signal, measurement of neighboring sectors, etc., that can result in switching from the idle mode to an active mode.

Figure 3:
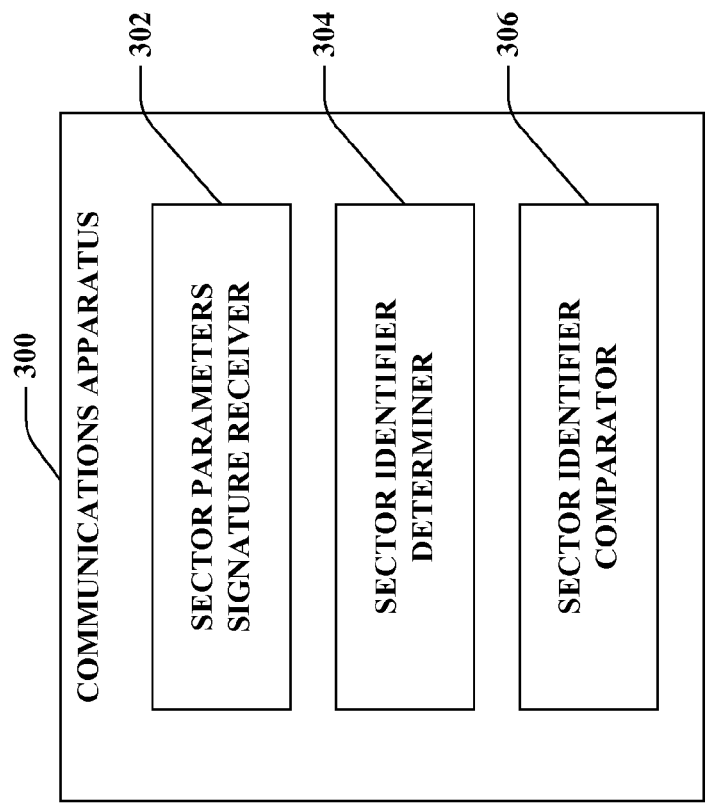
FIG. 3 is an illustration of an example communications apparatus for employment within a wireless communications environment.

Turning to FIG. 3, illustrated is a communications apparatus 300 for employment within a wireless communications environment. The communications apparatus 300 can be a base station or a portion thereof, a mobile device or a portion thereof, or substantially any communications apparatus that receives data transmitted in a wireless communications environment. The communications apparatus 300 can include a sector parameters signature receiver 302 that receives sector parameters signatures from various access points (not shown) in a wireless network, a sector identifier determiner 304 that can determine an expected sector-related identifier based at least in part on the computing one or more expected signatures, and a sector identifier comparator 306 that can compare the one or more computed expected signatures to the received signature to determine a confidence level with respect to correctly identifying a sector, access point, related group, etc. from the expected identifier. In this regard, when the confidence level is above a threshold (e.g., two or three compared expected identifiers), the communications apparatus 300 can subsequently utilize the expected identifier (e.g., to perform cell reselection or otherwise establish communications in the identified access point and/or the like, as described).

According to an example, the sector parameters signature receiver 302 can receive one or more sector parameters signatures transmitted from one or more access points; the signatures can be transmitted in an overhead broadcast message (such as an extended channel information (ECI) message), in one example. The sector parameters signatures can indicate whether parameters of a sector parameters message have changed with respect to a previous sector parameters message. In this regard, the sector parameters signature can indicate that a subsequent sector parameters message should be received to determine the modified parameters. Additionally, the sector parameters signature can be generated as a known function of a previous sector parameters signature, system time, and a sector-related identifier, such as a sector identifier, access point identifier, access point group identifier, and/or the like. The sector identifier determiner 304 can compute an expected sector parameters signature using an expected sector-related identifier using the known function and one or more known values. For example, using the system time, the sector identifier determiner 304 can also provide a previous sector parameters signature or an inferred signature to compute the expected sector parameters signature based on the known function.

The sector identifier comparator 306 can compare the computed sector parameters signature with the received sector parameters signature to determine whether the correct sector-related identifier was utilized in the computation. Thus, the sector-related identifier can be determined without actually reading the sector parameters message or other message to determine such. For example, the sector identifier comparator 306 can compare a number of sector parameters signatures generated by the sector identifier determiner 304 with received signatures. In this regard, a confidence level of correct identification can be achieved based on the number of correct matches between computed and received signatures, as described. It is to be appreciated, however, that the sector identifier comparator 306 can determine correct identification from one computed sector parameters signature, in one example. Since the identifier is used in generating the sector parameters signature, and can be unique, computing multiple signatures and comparing them to respective received signatures can create a high level of likelihood for correct identification utilizing an expected sector identifier in the sector parameters signature computation. In this regard, the communications apparatus 300 can determine a sector-related identifier from one or more sector parameters signature without expending the time or resources to actually read the sector parameters message. Utilizing the identification, the communications apparatus 300, as described, can take subsequent wireless network actions in the sector, such as verifying the sector, access point, and/or related group in a list of accessible entities, establishing communication in the sector based on the verification, reselecting one or more cells of the sector, camping on the sector, and/or the like, for example.

Figure 4:
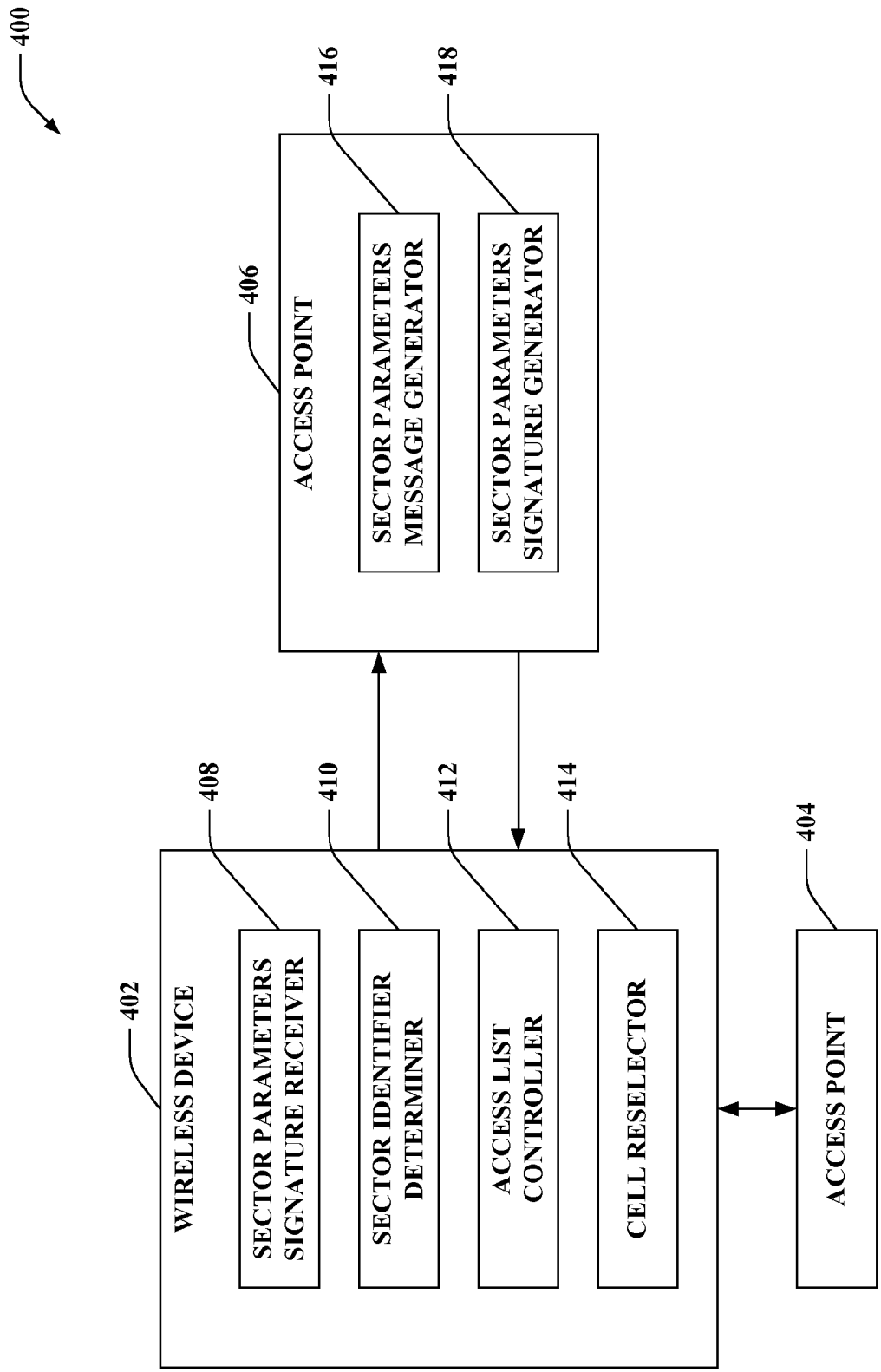
FIG. 4 is an illustration of an example wireless communications system that effectuates identifying sectors from sector parameters signatures.

Now referring to FIG. 4, illustrated is a wireless communications system 400 that facilitates specifying identifiers using sector parameters signatures in wireless communication networks. The wireless device 402, access point 404, and/or access point 406 can be a base station, femtocell, mobile device, or portion thereof. In one example, wireless device 402 can transmit information to an access point 404 and/or 406 over a reverse link or uplink channel; further wireless device 402 can receive information from access point 404 and/or 406 over a forward link or downlink channel. Moreover, system 400 can be a MIMO system. Also, the components and functionalities shown and described below in the wireless device 402 can be present in the access points 404 and/or 406 as well and vice versa, in one example; the configuration depicted excludes these components for ease of explanation.

Wireless device 402 includes a sector parameters signature receiver 408 that receives sector parameters signatures from access points 404 an/or 406 to facilitate evaluating parameters related thereto, a sector identifier determiner 410 that determines an expected sector-related identifier based at least in part on comparing one or more computed sector parameters signatures with a received sector parameters signatures, an access list controller 412 that maintains a list of identifiers related to accessible access points and/or groups of access points, and a cell reselector 414 that can perform cell reselection procedures and/or establish initial connection with one or more access points. In one example, the wireless device 402 can be communicating with access point 404, and the cell reselector 414 can perform reselection to access point 406 as described below in further detail.

The access point 406 comprises a sector parameters message generator 416 that creates a sector parameters message for broadcast over a wireless network to one or more wireless devices, such as wireless device 402. The sector parameters message can comprise information related to a given sector of the access point 406, such as a sector identifier, and/or additional parameters utilized to communicate in the sector. The access point 406 further comprises a sector parameters signature generator 418 that creates a signature for the sector parameters message. The signature can be generated based on the message and parameters utilized with a previous message so that a wireless device receiving the sector parameters signature can efficiently determine whether the parameters have changed based on a previous signature. In addition, as described, the sector parameters signature generator 418 can generate the sector parameters signature further based at least in part on a system time and a sector-related identifier, as described. The message and/or related signatures can be transmitted in an overhead broadcast message, such as an ECI channel, as mentioned.

According to an example, the wireless device 402 can be communicating with the access point 404 to receive wireless communication services and moving throughout a wireless network coverage area. The cell reselector 414 can evaluate surrounding sectors operated by disparate access points as the wireless device 402 moves in range by measuring parameters related to the access points, such as signal strength, services offered, identifications, data throughput, etc. In addition, the cell reselector 414 can rank the sectors according to the measured parameters using techniques described above (such as offsets and hysteresis related to desirable access points). When a sector ranks above the currently utilized sector, the cell reselector 414 can select the new sector and attempt cell reselection thereto. This can occur in an idle state, where the wireless device 402 camps on the new sector, and/or an active state, where the wireless device 402 continues communication with the new sector. In addition, the cell reselector 414 can be utilized to select an initial sector for communication therewith. Moreover, the cell reselector 414 can determine an access point and or group identifier related to an access point 406 that provides the sector from a pilot signal transmitted by the access point 406. The access point can be verified in a list of accessible access points and/or groups via access list controller 412.

The sector parameters message generator 416 can create one or more sector parameters messages comprising information related to sector communication. In addition, the sector parameters signature generator 418 can create a signature, as described, specifying whether parameters have changes with respect to a previous signature. The cell reselector 414 can evaluate a sector related to the access point 406 for reselection. In this regard, the sector parameters signature receiver 408 can receive a sector parameters signature for the access point 406 generated by the sector parameters signature generator 418 and transmitted over the wireless network. Utilizing the known function for generating the signature, the sector identifier determiner 410 can compute an expected sector parameters signature based on a predicted sector-related identifier, a time, and a previous signature, which can be predicted from expected parameters. It is to be appreciated that the expected parameters can be specified based at least in part on previous communication with surrounding sectors, a type of the sector, a location, and/or the like. In addition, the sector-related identifier can comprise an access point and/or restricted group identifier that indicates the access point 406 providing the sector is restricted with respect to signaling, data access, registration, and/or service.

As described, the sector identifier determiner 410 can compute multiple expected signatures using an expected sector-related identifier at different times and can compare the signatures with received signatures to determine a correct identification since the signatures are a known function of an identifier, which can be unique, a known time, and previous signature. Thus, a subsequently computed expected signature can increase likelihood of correct identification since the signature can change each time it is received. Once the sector identifier determiner 410 has identified the sector, access point, group, and/or the like based on one or more sector parameters signatures to a level of confidence, the access point 406 can be ranked in the list of access points for reselection. In one example, prior or subsequent to ranking the access point or related sector, the access list controller 412 can verify the sector-related identifier and/or a related group identifier in a list of accessible access points and/or groups. If it is in the list and the sector ranks highly, the cell reselector 414 can reselect one or more cells in the sector, in an active state, and/or camp on the sector, in an idle state. In addition, as described, the cell reselector 414 can utilize the determined identifier and/or other metrics to initially request communication in the sector.

According to one example, the sector identifier determiner 410 can determine a number of expected identifiers to compute based at least in part on timing. Thus, where the wireless device 402 has a larger amount of time for cell reselection, the sector identifier determiner 410 can compute more sector parameters signatures using the expected sector-related identifiers for a more confident determination of the actual identifier as the signature can change over time. As mentioned, though a collision can occur among sector parameters signatures for multiple sectors, since the signature is based on an identifier that can be unique and time, the signatures can be different in a subsequent signature transmission. Thus, the more signatures that are computed and compared, the greater chance of a correct identification. In this regard, the wireless device 402 need not read the sector parameters message generated by the sector parameters message generator 416 for the sector, which conserves time and resources since the messages are larger and not broadcast as often as the signatures.

Figure 5:
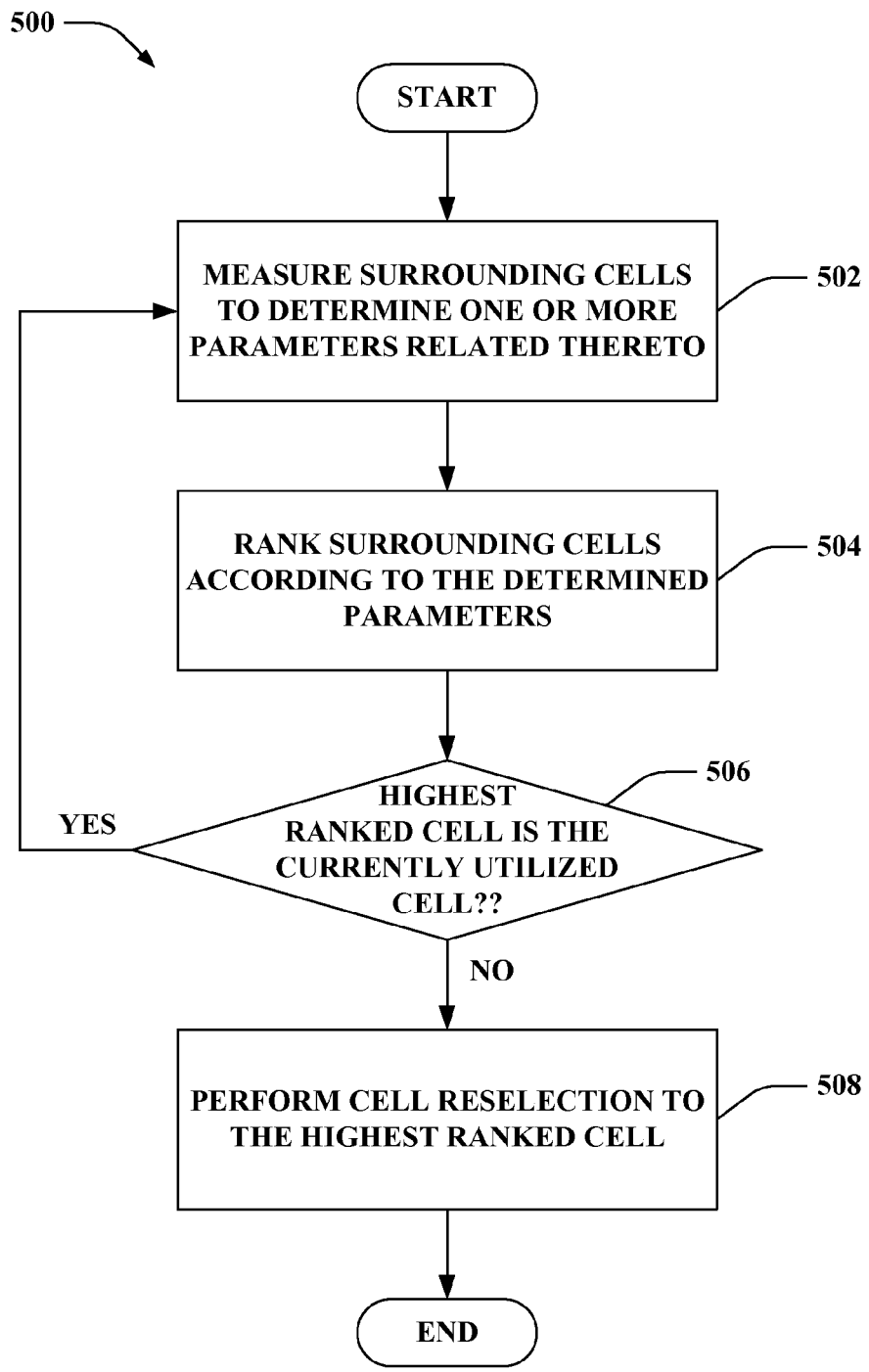
FIG. 5 is an illustration of an example methodology that facilitates performing cell reselection in wireless networks.
Figure 6:
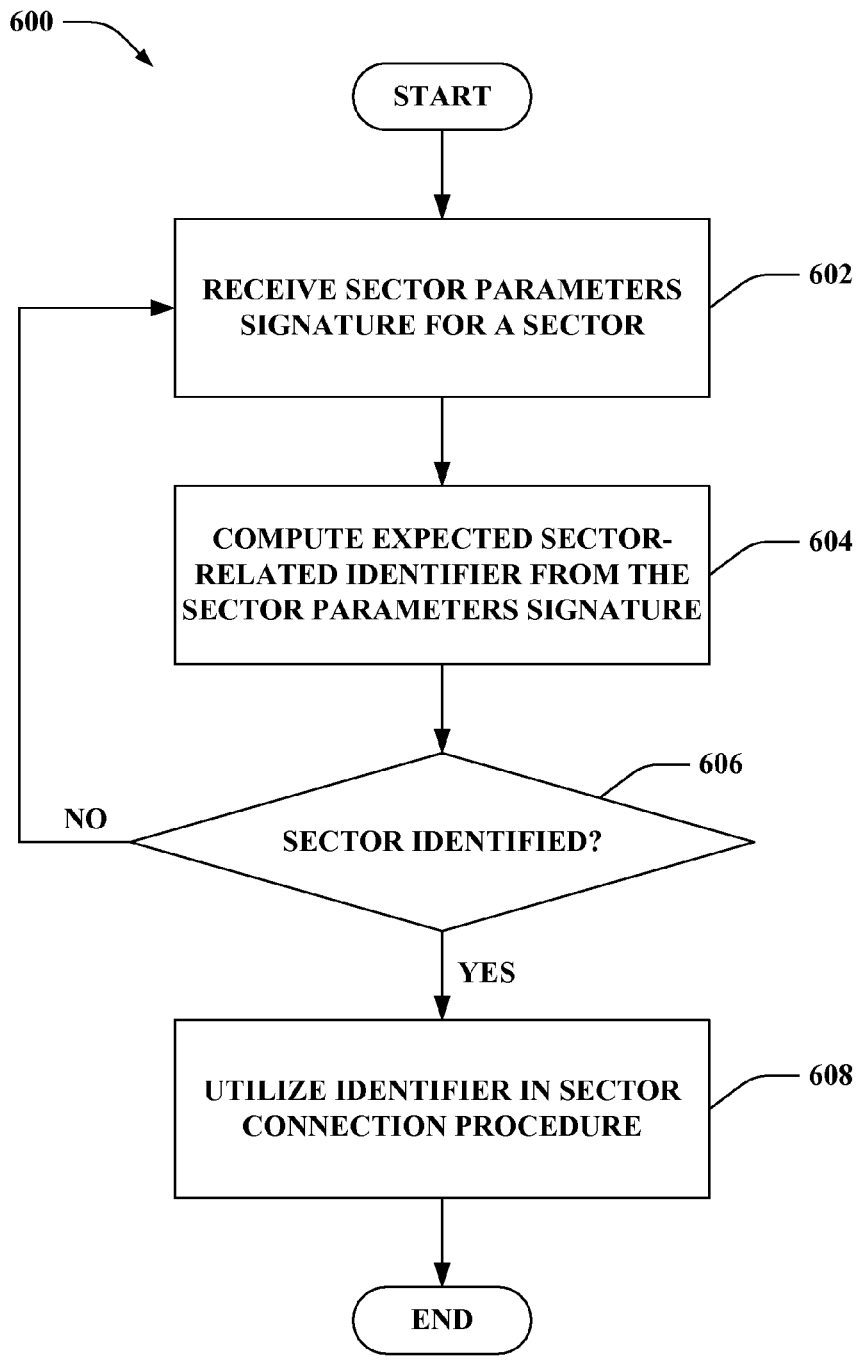
FIG. 6 is an illustration of an example methodology that facilitates determining sector identification from a sector parameters signature.
Figure 7:
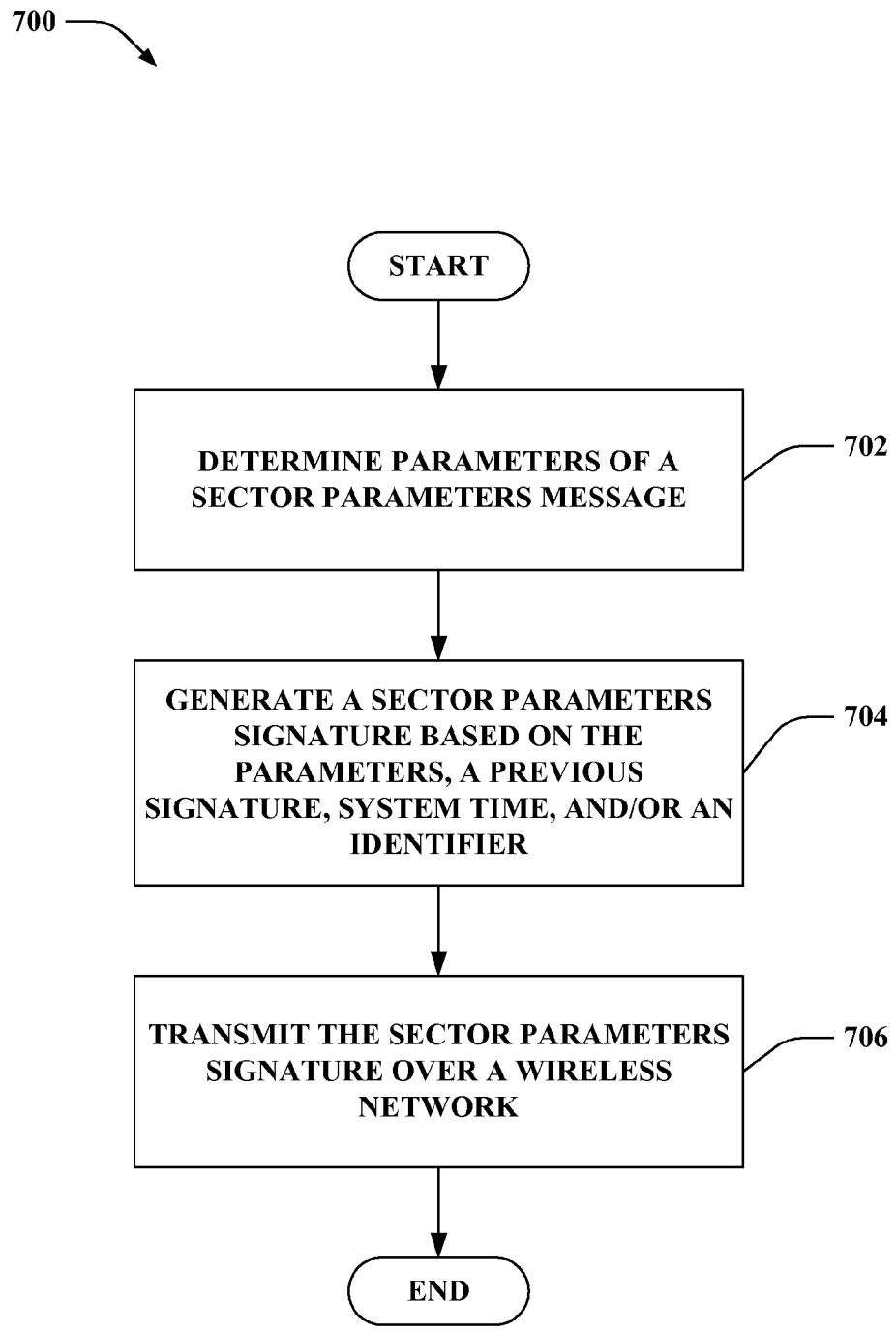
FIG. 7 is an illustration of an example methodology that facilitates generating sector parameters signatures that identify a sector.

Referring to FIGS. 5-7, methodologies relating to cell reselection and determining sector-related identifiers from sector parameters signatures are illustrated. While, for purposes of simplicity of explanation, the methodologies are shown and described as a series of acts, it is to be understood and appreciated that the methodologies are not limited by the order of acts, as some acts may, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more embodiments.

Turning to FIG. 5, a methodology 500 that facilitates cell reselection in wireless communications is displayed. At 502, surrounding cells are measured to determine one or more parameters related thereto. As described, the parameters can relate to communication metrics, such as signal strength, throughput, etc. and/or one or more additional considerations, such as an access point identifier, a group identifier, sector identifier, services offered, a related access provider, etc. In addition, the parameters can relate to the cell being provided by a home access point, which provides enhanced billing aspects, additional service or speeds, and/or the like. The parameters can also relate to offsets or hysteresis to increase consideration of desirable access points (such as a home access point, for example) and/or decrease consideration of other access points. At 504, the surrounding cells can be ranked according to the determined parameters. The ranking can indicate an order of desirable cells from which to receive wireless communication services.

At 506, it can be determined whether the highest ranked cell is that currently utilized. Such a determination can be utilized to ensure connection with an optimal access point. If the highest ranked cell is the cell currently utilized to receive wireless communications, the method proceeds back to step 502 to again measure surrounding cells. This can be based on a timer, in one example, as to not flood the network with cell measurements or spend resources by constantly measuring the cells. If the highest ranked cell is not the currently utilized cell, at 508, cell reselection can be performed, as described herein, to reselect the highest ranked cell. It is to be appreciated, in one example, that once reselection is complete, the method, in one example, can proceed back to step 502 to continue measuring surrounding cells. As described, the access points can be base stations, femtocells, and/or the like.

Turning to FIG. 6, illustrated is a methodology 600 that facilitates sector identification in wireless networks. At 602, a sector parameters signature is received for a sector. As described, the sector parameters signature can relate to specifying whether parameters of a sector parameters message have changed. In addition, the sector parameters signature can be generated using a known function of a previous sector parameters signature, a system time, and an identifier. Thus, at 604, a sector parameters signature can be computed from an expected sector-related identifier. The known function can be utilized, as described, where the time is known and the previous sector parameters signature can also be known and/or inferred based on previously received signatures related to the access point. In addition, a predicted identifier can be utilized as well. In some cases, the sector parameters signatures can be utilized for computations with respect to disparate or similar access points.

At 606, it can be determined whether the computed signature matches the received signature (e.g. whether the sector-related identifier utilized to compute the sector parameters message is correct). As described, this can relate to a confidence level and/or time available for the identification. Thus, if more time is available, the method can proceed to 602 to receive and compute an additional sector parameters signature and compute another expected sector parameters message at 604. In addition, where there are multiple expected sector parameters signatures computed, the expected signatures can be compared to received signatures at 606 to determine whether the sector, access point, access point group, and/or the like have been identified. As described, the more matches in expected signatures, the better likelihood of correct identification. At 608, the identifier can be utilized in a sector connection procedure. As described, this can include an initial connection to the sector, a reselection to one or more related cells in an active state, camping on the sector in an idle state, and/or the like. It is to be appreciated that a pilot signal can be evaluated prior to the sector parameters signature to determine whether the access point providing the sector can be accessed according to a maintained list of access points and/or groups, as described.

Turning to FIG. 7, illustrated is a methodology 700 that transmits sector parameters signatures over a wireless network for specifying change in parameters. At 702, parameters of a sector parameters message can be determined. The parameters can relate to communicating in a wireless network (e.g., sector identifier, access parameters, etc.). At 704, a sector parameters signature can be generated based on the parameters, a previous signature, system time, and/or an identifier. Thus, the sector parameters signature is a known function of one or more of the foregoing variables. As described, the signature can be based on the parameters and previous parameters to indicate whether the parameters have changed between related messages. In another example, the previous signature can be utilized in the generating the sector parameters signature to indicate a change in the message parameters. At 706, the sector parameters signature can be transmitted over the wireless network to facilitate such identification. It is to be appreciated that the sector parameters signature can also indicate whether parameters in a sector parameters message have changed, as described.

It will be appreciated that, in accordance with one or more aspects described herein, inferences can be made regarding many aspects of cell reselection, such as measuring the parameters, ranking the cells according to the parameters (and/or additional parameters), and even aspects of actual reselection (such as when to perform the reselection, etc.) as described. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. In one example, inferences can additionally be made in determining parameters of cells during measurement, such as identification based on inferring previous sector parameters signatures, as described.

Figure 8:
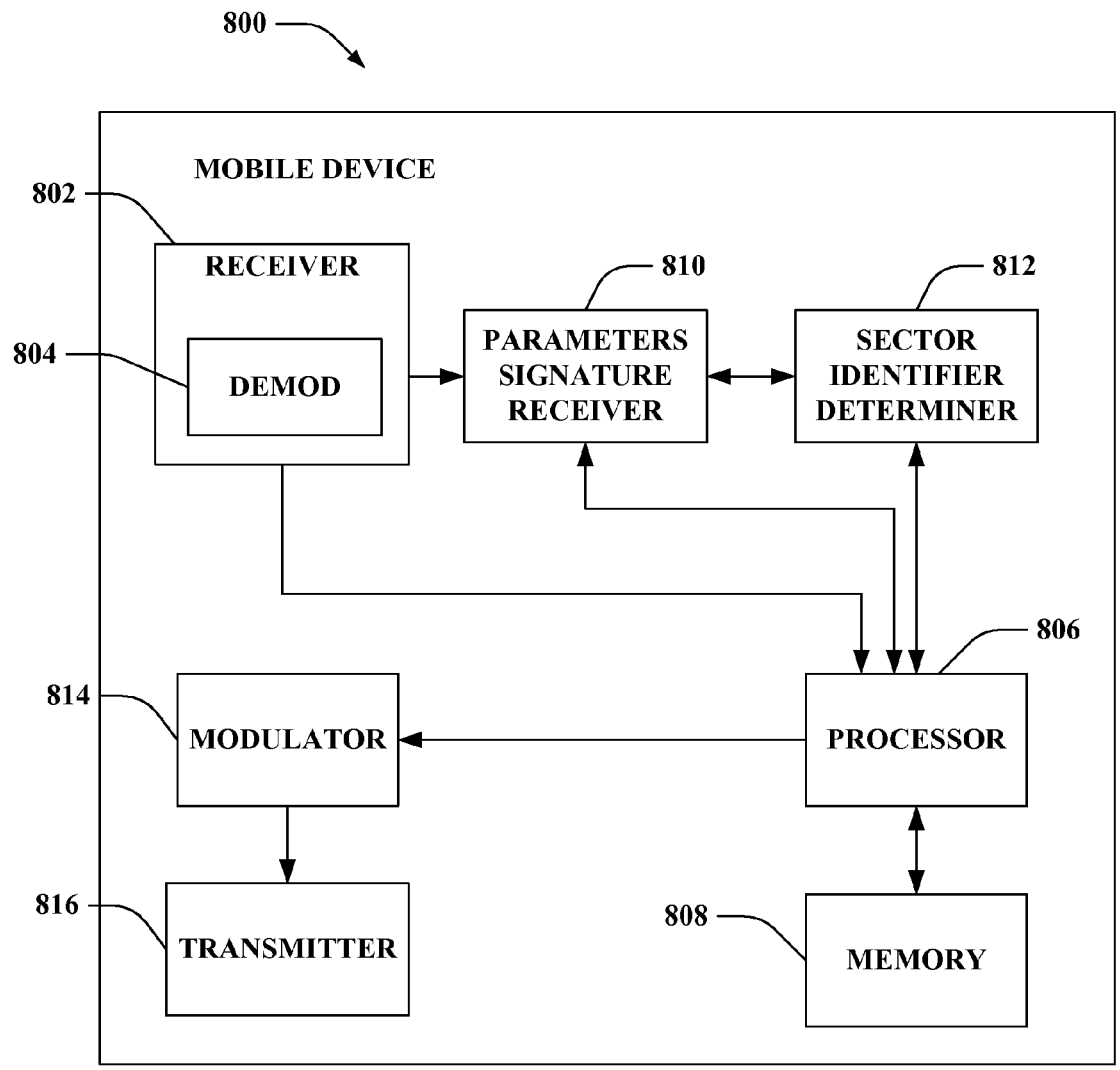
FIG. 8 is an illustration of an example mobile device that facilitates identifying a sector using a sector parameters signature received therefrom.

FIG. 8 is an illustration of a mobile device 800 that facilitates identifying access points based at least in part on sector parameters signatures. Mobile device 800 comprises a receiver 802 that receives a signal from, for instance, a receive antenna (not shown), performs typical actions on (e.g. filters, amplifies, downconverts, etc.) the received signal, and digitizes the conditioned signal to obtain samples. Receiver 802 can comprise a demodulator 804 that can demodulate received symbols and provide them to a processor 806 for channel estimation. Processor 806 can be a processor dedicated to analyzing information received by receiver 802 and/or generating information for transmission by a transmitter 816, a processor that controls one or more components of mobile device 800, and/or a processor that both analyzes information received by receiver 802, generates information for transmission by transmitter 816, and controls one or more components of mobile device 800.

Mobile device 800 can additionally comprise memory 808 that is operatively coupled to processor 806 and that can store data to be transmitted, received data, information related to available channels, data associated with analyzed signal and/or interference strength, information related to an assigned channel, power, rate, or the like, and any other suitable information for estimating a channel and communicating via the channel. Memory 808 can additionally store protocols and/or algorithms associated with estimating and/or utilizing a channel (e.g., performance based, capacity based, etc.).

It will be appreciated that the data store (e.g., memory 808) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 808 of the subject systems and methods is intended to comprise, without being limited to, these and any other suitable types of memory.

Processor 806 and/or receiver 802 can further be operatively coupled to a parameters signature receiver 810 that can receive a sector parameters signature from one or more access points that indicates whether sector parameters have changed for a subsequent parameters message, as described. In addition, the sector parameters message can have been generated as a known function of a previous signature, system time, and an identifier, as described. Processor 806 can be further operatively coupled to a sector identifier determiner 812 that can compute an expected sector parameters signature utilizing a sector-related identifier in a known function with one or more known values (e.g., time and previous signatures), as described. The sector identifier 812 can compute a number of expected identifiers from subsequent signatures to confirm correct identification of the related sector, access point, group, etc. The mobile device 800, as described, can take subsequent action based at least in part on the identification (such as communication initialization, cell reselection, etc.). Mobile device 800 still further comprises a modulator 814 and transmitter 816 that respectively modulate and transmit signals to, for instance, a base station, another mobile device, etc. Although depicted as being separate from the processor 806, it is to be appreciated that the parameters signature receiver 810, sector identifier determiner 812, demodulator 804, and/or modulator 814 can be part of the processor 806 or multiple processors (not shown).

Figure 9:
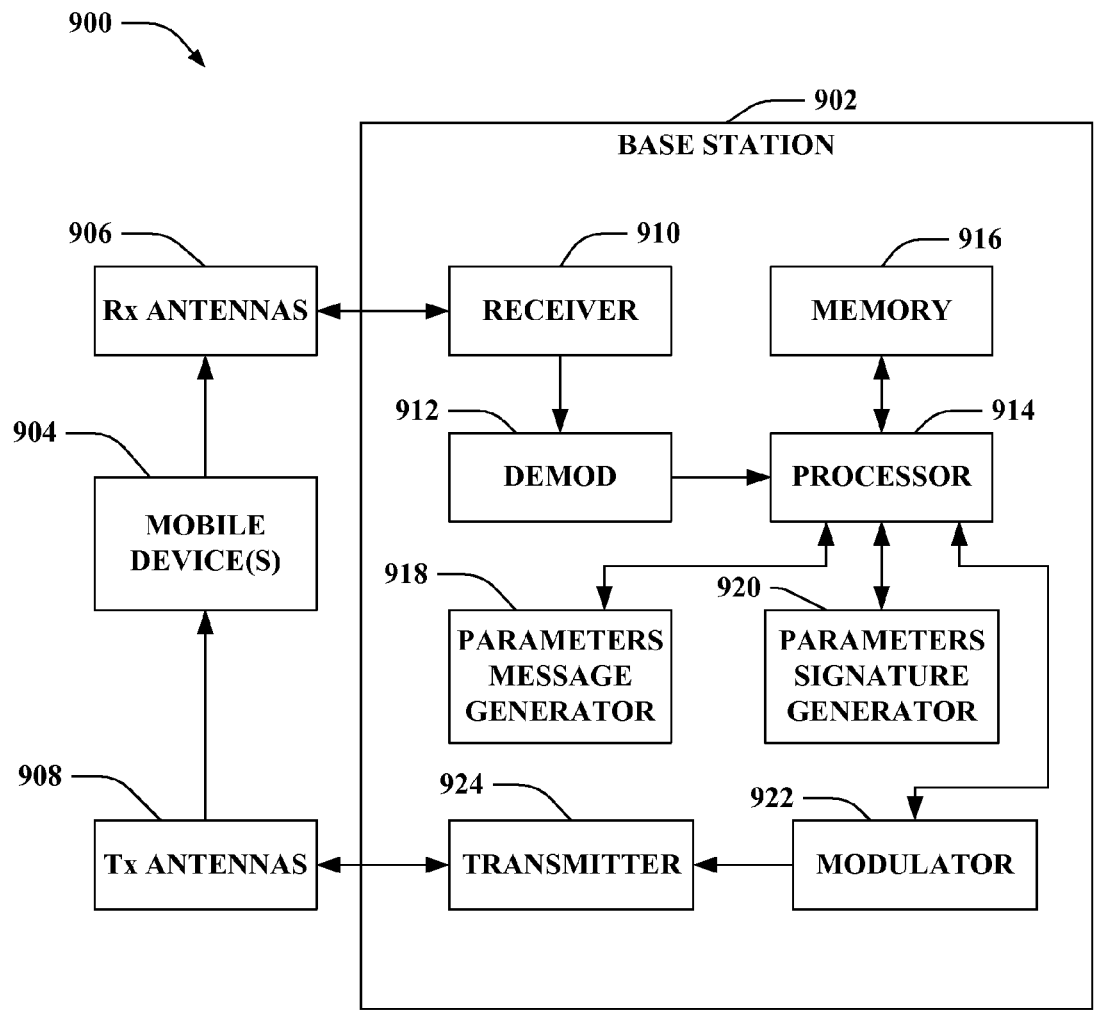
FIG. 9 is an illustration of an example system that generates sector parameters signatures using a known function to facilitate sector identification.

FIG. 9 is an illustration of a system 900 that facilitates generating sector parameters signatures for identification and indication of change in sector parameters messages. The system 900 comprises a base station 902 (e.g., access point, femtocell, . . . ) with a receiver 910 that receives signal(s) from one or more mobile devices 904 through a plurality of receive antennas 906, and a transmitter 924 that transmits to the one or more mobile devices 904 through a transmit antenna 908. Receiver 910 can receive information from receive antennas 906 and is operatively associated with a demodulator 912 that demodulates received information. Demodulated symbols are analyzed by a processor 914 that can be similar to the processor described above with regard to FIG. 8, and which is coupled to a memory 916 that stores information related to estimating a signal (e.g., pilot) strength and/or interference strength, data to be transmitted to or received from mobile device(s) 904 (or a disparate base station (not shown)), and/or any other suitable information related to performing the various actions and functions set forth herein. Processor 914 is further coupled to a parameters message generator 918 that creates a sector parameters message, as described that indicates one or more communication parameters for the sector. The processor 914 is further coupled to a parameters signature generator 920 that can create a sector parameters signature that indicates whether parameters of the message have changed with respect to a previous signature.

According to an example, the parameters signature generator 920 can generate the sector parameters signature further as a function of the previous signature, a system time, and an identifier, and the transmitter 924 can transmit the signature to one or more mobile devices 904. Thus, the mobile devices 904 can determine an expected sector-related identifier by knowing and/or inferring the time and a previous signature. In one example, an expected signature can be utilized where the mobile devices 904 have not received the previous signature, as described. Furthermore, although depicted as being separate from the processor 914, it is to be appreciated that the parameters message generator 918, parameters signature generator 920, demodulator 912, and/or modulator 922 can be part of the processor 914 or multiple processors (not shown).

Figure 10:
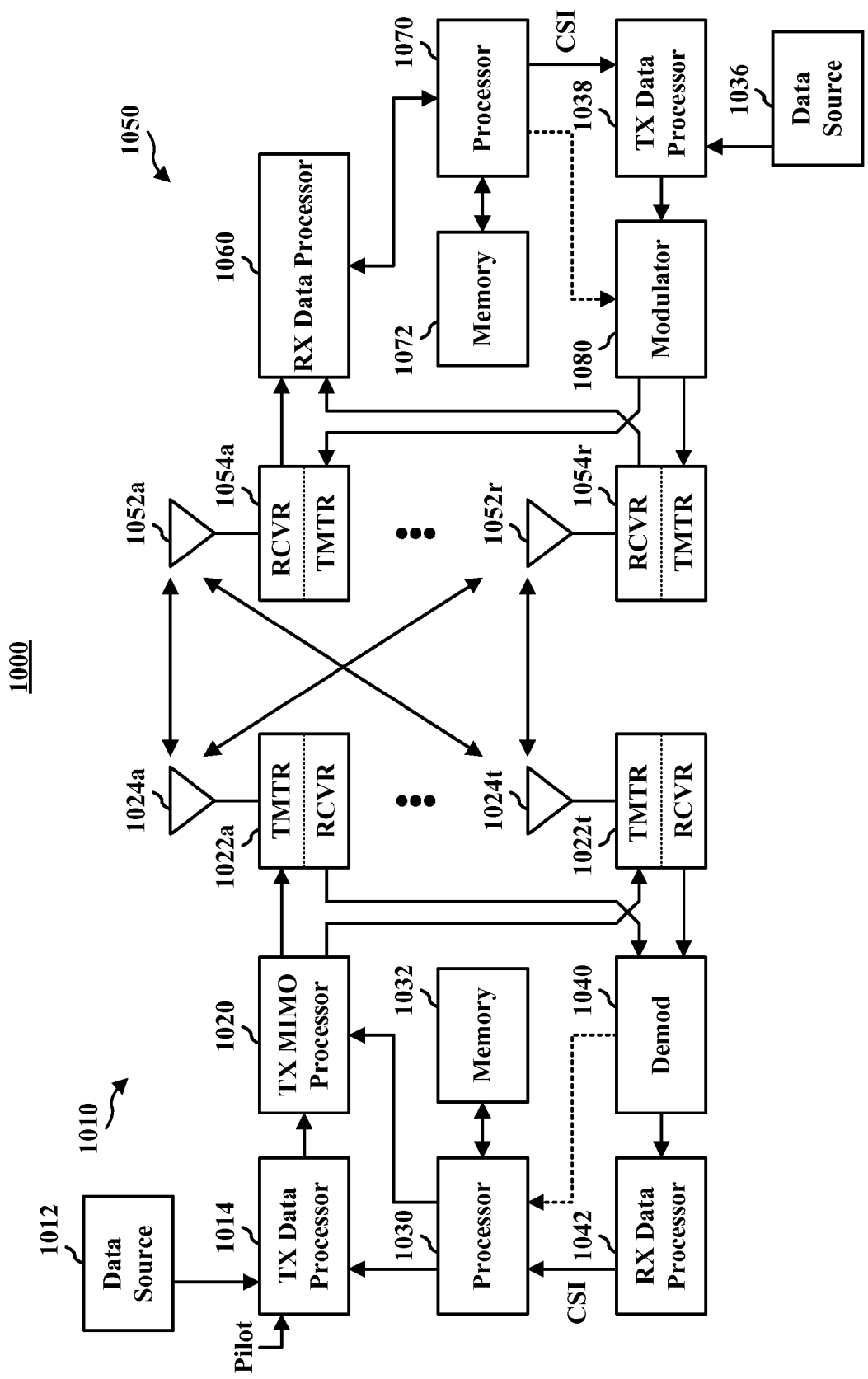
FIG. 10 is an illustration of an example wireless network environment that can be employed in conjunction with the various systems and methods described herein.

FIG. 10 shows an example wireless communication system 1000. The wireless communication system 1000 depicts one base station 1010 and one mobile device 1050 for sake of brevity. However, it is to be appreciated that system 1000 can include more than one base station and/or more than one mobile device, wherein additional base stations and/or mobile devices can be substantially similar or different from example base station 1010 and mobile device 1050 described below. In addition, it is to be appreciated that base station 1010 and/or mobile device 1050 can employ the systems (FIGS. 1-4 and 8-9) and/or methods (FIGS. 5-7) described herein to facilitate wireless communication there between.

At base station 1010, traffic data for a number of data streams is provided from a data source 1012 to a transmit (TX) data processor 1014. According to an example, each data stream can be transmitted over a respective antenna. TX data processor 1014 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at mobile device 1050 to estimate channel response. The multiplexed pilot and coded data for each data stream can be modulated (e.g. symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 1030.

The modulation symbols for the data streams can be provided to a TX MIMO processor 1020, which can further process the modulation symbols (e.g., for OFDM). TX MIMO processor 1020 then provides $N_T$ modulation symbol streams to $N_T$ transmitters (TMTR) 1022a through 1022t. In various embodiments, TX MIMO processor 1020 applies beamforming weights to the symbols of the data streams and to the antenna from which the symbol is being transmitted.

Each transmitter 1022 receives and processes a respective symbol stream to provide one or more analog signals, and further conditions (e.g. amplifies, filters, and upconverts) the analog signals to provide a modulated signal suitable for transmission over the MIMO channel. Further, $N_T$ modulated signals from transmitters 1022a through 1022t are transmitted from $N_T$ antennas 1024a through 1024t, respectively.

At mobile device 1050, the transmitted modulated signals are received by $N_R$ antennas 1052a through 1052r and the received signal from each antenna 1052 is provided to a respective receiver (RCVR) 1054a through 1054r. Each receiver 1054 conditions (e.g., filters, amplifies, and downconverts) a respective signal, digitizes the conditioned signal to provide samples, and further processes the samples to provide a corresponding "received" symbol stream.

An RX data processor 1060 can receive and process the $N_R$ received symbol streams from $N_R$ receivers 1054 based on a particular receiver processing technique to provide $N_T$ "detected" symbol streams. RX data processor 1060 can demodulate, deinterleave, and decode each detected symbol stream to recover the traffic data for the data stream. The processing by RX data processor 1060 is complementary to that performed by TX MIMO processor 1020 and TX data processor 1014 at base station 1010.

A processor 1070 can periodically determine which preceding matrix to utilize as discussed above. Further, processor 1070 can formulate a reverse link message comprising a matrix index portion and a rank value portion.

The reverse link message can comprise various types of information regarding the communication link and/or the received data stream. The reverse link message can be processed by a TX data processor 1038, which also receives traffic data for a number of data streams from a data source 1036, modulated by a modulator 1080, conditioned by transmitters 1054a through 1054r, and transmitted back to base station 1010.

At base station 1010, the modulated signals from mobile device 1050 are received by antennas 1024, conditioned by receivers 1022, demodulated by a demodulator 1040, and processed by a RX data processor 1042 to extract the reverse link message transmitted by mobile device 1050. Further, processor 1030 can process the extracted message to determine which precoding matrix to use for determining the beamforming weights.

Processors 1030 and 1070 can direct (e.g., control, coordinate, manage, etc.) operation at base station 1010 and mobile device 1050, respectively. Respective processors 1030 and 1070 can be associated with memory 1032 and 1072 that store program codes and data. Processors 1030 and 1070 can also perform computations to derive frequency and impulse response estimates for the uplink and downlink, respectively.

It is to be understood that the embodiments described herein can be implemented in hardware, software, firmware, middleware, microcode, or any combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

When the embodiments are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

Figure 11:
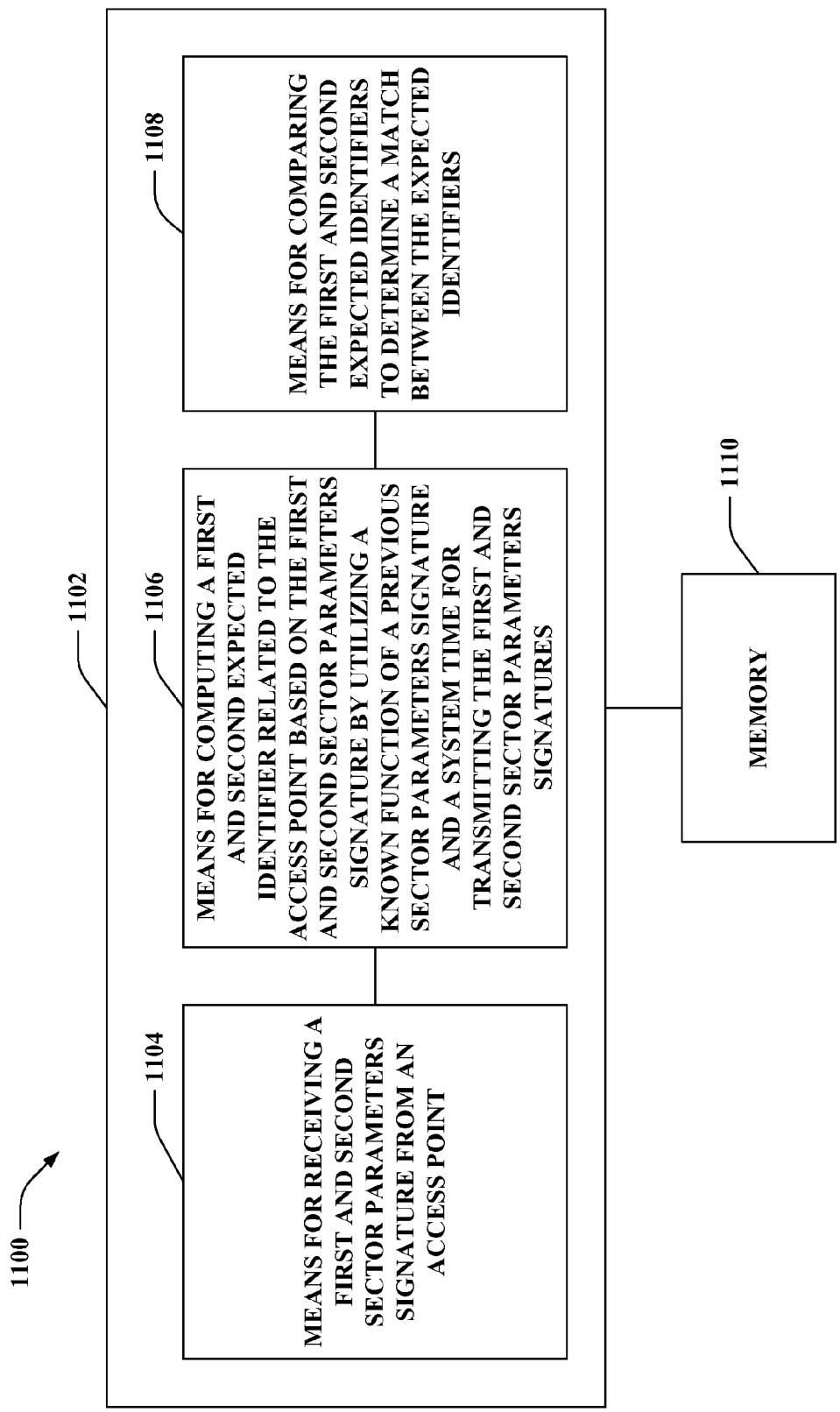
FIG. 11 is an illustration of an example system that identifies a sector utilizing a known function with respect to a sector parameters signature.

Turning to FIG. 11, illustrated is a system 1100 that determines sector identifiers based at least in part on sector parameters signatures. System 1100 can reside within a base station, femtocell, mobile device, etc., for instance. As depicted, system 1100 includes functional blocks that can represent functions implemented by a processor, software, or combination thereof (e.g. firmware). System 1100 includes a logical grouping 1102 of electrical components that act in conjunction. Logical grouping 1102 can include means for receiving a first sector parameters signature from an access point 1104. The signature can be generated using a known function, as described, and can indicate whether sector parameters have changed between sector parameters messages. Moreover, logical grouping 1102 can include means for computing a second sector parameters signature utilizing a known function along with a predicted identifier, a previous sector parameters signature, and a system time for transmitting the first sector parameters signatures 1106. Thus, the known function can utilize a previous signature, time, and predicted identifier such that utilizing the time and a previously received or inferred signature can allow calculation of the expected identifier. Further, logical grouping 1102 can include means for comparing the first and second sector parameters signatures to determine a match between the identifier and the predicted identifier 1108. As described, since the signatures are generated utilizing known or inferred parameters, additional identifiers calculated from subsequent signatures can increase likelihood of correct identification, in one example. Additionally, system 1100 can include a memory 1110 that retains instructions for executing functions associated with electrical components 1104, 1106, and 1108. While shown as being external to memory 1110, it is to be understood that electrical components 1104, 1106, and 1108 can exist within memory 1110.

Figure 12:
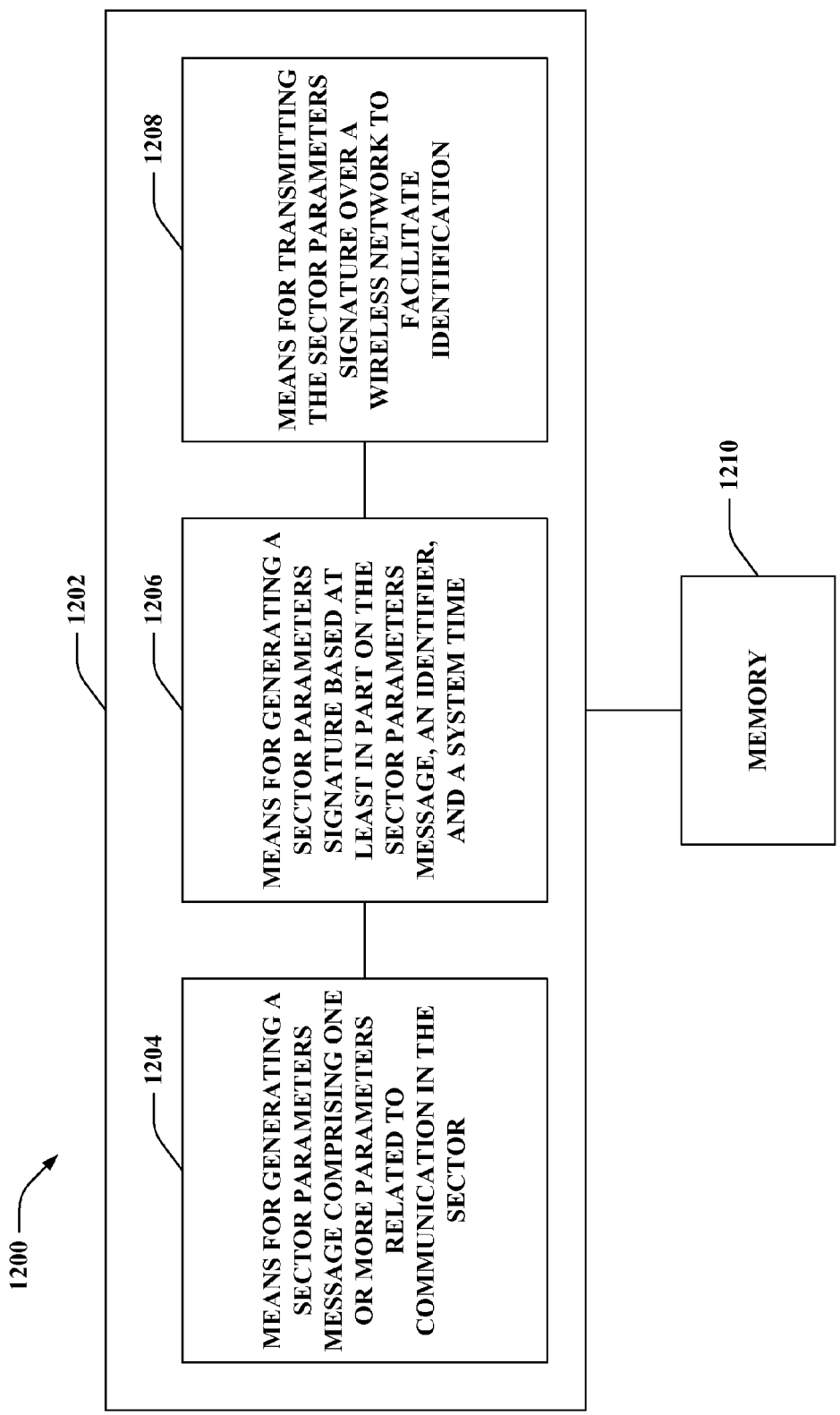
FIG. 12 is an illustration of an example system that transmits a generated sector parameters signature that identifies a sector.

Referring now to FIG. 12, illustrated is a system 1200 that generates sector parameters signatures using a known function to facilitate sector identification. System 1200 can reside within a base station, femtocell, mobile device, etc., for instance. As depicted, system 1200 includes functional blocks that can represent functions implemented by a processor, software, or combination thereof (e.g., firmware). System 1200 includes a logical grouping 1202 of electrical components that can facilitate generating the sector parameters signatures. Logical grouping 1202 can include means for generating a sector parameters message comprising one or more parameters related to communication in the sector 1204. As described, the message can comprise one or more communications parameters for the sector, such as a sector-related identifier. Moreover, logical grouping 1202 can include means for generating a sector parameters signature based at least in part on the sector parameters message, an identifier, and a system time 1206. The signature can indicate information regarding the parameters of the message, such as if the parameters have changed between the current and a previous message. Further, logical grouping 1202 can include means for transmitting the sector parameters signature over a wireless network to facilitate identification 1208. In this regard, the sector parameters message need not be read by receiving devices; rather identification can occur utilizing the signatures. This can conserve time and resources in sector identification. Additionally, system 1200 can include a memory 1210 that retains instructions for executing functions associated with electrical components 1204, 1206, and 1208. While shown as being external to memory 1210, it is to be understood that electrical components 1204, 1206, and 1208 can exist within memory 1210.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

What is claimed is:

1. A method for identifying an access point in a wireless communication network, comprising:
   receiving a first sector parameters signature from an access point, wherein the first sector parameters signature is generated based at least in part on a previous sector parameters signature, an identifier, and a system time of transmitting the first sector parameters signature;
   computing a second sector parameters signature based at least in part on the previous sector parameters signature, the system time, and a predicted identifier;
   comparing the first and second sector parameters signatures to determine a match between the identifier and the predicted identifier; and
   establishing communication based at least in part on the match between the identifier and the predicted identifier.

2. The method of claim 1, further comprising determining the system time based on receiving the first sector parameters signature.

3. The method of claim 1, further comprising requesting connection establishment with the access point based at least in part on the match between the identifier and the predicted identifier.

4. The method of claim 3, wherein the connection establishment is requested as part of a cell reselection command related to communicating with a disparate access point.

5. The method of claim 1, further comprising camping on the access point based at least in part on the match between the identifier and predicted identifier.

6. The method of claim 1, wherein the first sector parameters signatures is received in broadcast overhead messages.

7. The method of claim 1, further comprising receiving a pilot signal from the access point to determine whether access is desired from the access point.

8. The method of claim 1, wherein the identifier is a restricted group identifier.

9. The method of claim 8, wherein the restricted group identifier is text based.

10. The method of claim 8, wherein the restricted group identifier indicates that the access point is restricted with respect to signaling, data access, registration, and/or service.

11. The method of claim 1, wherein the second sector parameters signature is computed using a generated random or pseudo random sequence of signatures.

12. A wireless communications apparatus, comprising:
    at least one processor configured to:
       receive a first sector parameters signature from an access point, wherein the first sector parameters signature is generated based at least in part on a previous sector parameters signature, an identifier and a system time of transmitting the first sector parameters signature;
       determine a second sector parameters message using a predicted identifier, the previous sector parameters signature, and the system time;
       compare the identifier to the predicted identifier to determine a match therebetween; and
       establish communication based at least in part on the match; and
    a memory coupled to the at least one processor.

13. A wireless communications apparatus that facilitates identifying an access point in a wireless network, comprising:
    means for receiving a first sector parameters signature from an access point;
    means for computing a second sector parameters signature utilizing a function along with a predicted identifier, a previous sector parameters signature, and a system time for transmitting the first sector parameters signatures;
    means for comparing the first and second sector parameters signatures to determine a match between the identifier and the predicted identifier; and
    means for establishing communication based at least in part on the match between the identifier and the predicted identifier.

14. A computer program product, comprising:
    a non-transitory computer-readable medium comprising:
       code for causing at least one computer to receive a first sector parameters signature from an access point, wherein the first sector parameters signature is generated based at least in part on a previous sector parameters signature, an identifier, and a system time of transmitting the first sector parameters signature;
       code for causing the at least one computer to compute a second sector parameters signature based at least in part on the previous sector parameters signature, the system time, and a predicted identifier; and code for causing the at least one computer to compare the first and second sector parameters signatures to determine a match between the identifier and the predicted identifier; and code for causing the at least one computer to establish communication based at least in part on the match between the identifier and the predicted identifier.

15. An apparatus, comprising:
a sector parameters signature receiver that receives a first sector parameters signature from a sector generated using a function based at least in part on a previous sector parameters signature, a system time, and an identifier;
a sector identifier determiner that computes a second sector parameters signature based at least in part on the function utilizing a predicted identifier, the previous sector parameters signature, and the system time, the sector identifier determiner compares the first and second sector parameters signatures to determine a match between the identifier and the predicted identifier; and
a cell reselector that establishes communication in the sector based at least in part on the match between the identifier and the predicted identifier.

16. The apparatus of claim 15, wherein the cell reselector establishes communication in the sector in an idle communication mode based at least in part on an identified match between the identifier and the predicted identifier.

17. The apparatus of claim 15, wherein the sector parameters signature receiver receives the first sector parameters signatures in one or more broadcast overhead messages.

18. The apparatus of claim 15, wherein the cell reselector receives a pilot signal from an access point related to the sector and determines whether access is desired from the access point based at least in part on an identifier in the pilot signal.

19. The apparatus of claim 15, wherein the identifier is a restricted group identifier.

20. The apparatus of claim 19, wherein the restricted group identifier is text based.

21. The apparatus of claim 19, wherein the restricted group identifier indicates that the access point is restricted with respect to signaling, data access, registration, and/or service.

* * * * *